(12) United States Patent
Kaneko et al.

(10) Patent No.: US 10,097,666 B2
(45) Date of Patent: Oct. 9, 2018

(54) ACCESSING A SERVICE USING AN ENCRYPTED TOKEN

(71) Applicant: SONY CORPORATION, Tokyo (JP)

(72) Inventors: Takeru Kaneko, Tokyo (JP); Hiroshi Nakayama, Chiba (JP); Toshiaki Enami, Tokyo (JP); Kohei Umemoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/409,575

(22) PCT Filed: Apr. 11, 2013

(86) PCT No.: PCT/JP2013/002460
§ 371 (c)(1),
(2) Date: Dec. 19, 2014

(87) PCT Pub. No.: WO2014/002343
PCT Pub. Date: Jan. 3, 2014

(65) Prior Publication Data
US 2015/0326692 A1 Nov. 12, 2015

(30) Foreign Application Priority Data

Jun. 27, 2012 (JP) .................................. 2012-143953

(51) Int. Cl.
*H04L 9/00* (2006.01)
*H04L 29/08* (2006.01)
*H04L 29/06* (2006.01)
*G06F 21/41* (2013.01)
*G06F 21/62* (2013.01)

(52) U.S. Cl.
CPC .............. *H04L 67/32* (2013.01); *G06F 21/41* (2013.01); *G06F 21/6245* (2013.01); *H04L 63/0428* (2013.01); *H04L 63/061* (2013.01); *H04L 63/0815* (2013.01); *H04L 63/10* (2013.01)

(58) Field of Classification Search
CPC .......... G06F 21/60; H04L 9/00; H04L 9/3213
See application file for complete search history.

(56) References Cited

U.S. PATENT DOCUMENTS

| | | | |
|---|---|---|---|
| 7,685,206 B1 * | 3/2010 | Mathew ................ | H04L 63/105 707/785 |
| 8,732,479 B1 * | 5/2014 | Henriksen ........... | G06F 11/1464 709/201 |
| 2003/0172090 A1 | 9/2003 | Asunmaa et al. | |

(Continued)

FOREIGN PATENT DOCUMENTS

JP 2009-282734 A 12/2009

OTHER PUBLICATIONS

International Search Report dated Sep. 20, 2013 in PCT/JP2013/002460.

*Primary Examiner* — Josnel Jeudy
(74) *Attorney, Agent, or Firm* — Chip Law Group

(57) ABSTRACT

An information processing method includes receiving a request for user data that is related to an external service, and retrieving the user data segments based on the request. The user data segments are then combined to generate the user data, which is then provided to the client device that requested the user data. After receiving the user data, the client device uses the user data to access the external service to which the data relates.

20 Claims, 13 Drawing Sheets

(56) References Cited

U.S. PATENT DOCUMENTS

| | | | |
|---|---|---|---|
| 2003/0208693 A1* | 11/2003 | Yoshida | H04L 29/06 |
| | | | 726/26 |
| 2004/0049687 A1 | 3/2004 | Orsini et al. | |
| 2006/0018523 A1* | 1/2006 | Saitoh | G06K 9/001 |
| | | | 382/124 |
| 2006/0136524 A1* | 6/2006 | Wohlers | H04L 67/02 |
| 2008/0244277 A1 | 10/2008 | Orsini et al. | |
| 2008/0244716 A1* | 10/2008 | Goto | H04L 63/0876 |
| | | | 726/5 |
| 2009/0217362 A1 | 8/2009 | Nanda et al. | |
| 2010/0235754 A1* | 9/2010 | Leitheiser | H04L 63/0884 |
| | | | 715/742 |
| 2010/0251352 A1* | 9/2010 | Zarchy | G06F 21/10 |
| | | | 726/9 |
| 2011/0010542 A1* | 1/2011 | Choi | H04L 9/3213 |
| | | | 713/168 |
| 2011/0016534 A1* | 1/2011 | Jakobsson | G06F 21/316 |
| | | | 726/28 |
| 2011/0082767 A1* | 4/2011 | Ryu | G06Q 20/32 |
| | | | 705/26.35 |
| 2011/0179271 A1 | 7/2011 | Orsini et al. | |
| 2011/0179287 A1 | 7/2011 | Orsini et al. | |
| 2012/0066757 A1 | 3/2012 | Vysogorets et al. | |
| 2012/0136861 A1* | 5/2012 | Lee | G06F 17/30867 |
| | | | 707/737 |
| 2012/0179910 A1 | 7/2012 | Orsini et al. | |
| 2013/0054968 A1* | 2/2013 | Gupta | H04L 63/0428 |
| | | | 713/168 |
| 2013/0212405 A1 | 8/2013 | Orsini et al. | |
| 2014/0123240 A1* | 5/2014 | Seo | H04L 63/0807 |
| | | | 726/4 |

* cited by examiner

[Fig. 1]
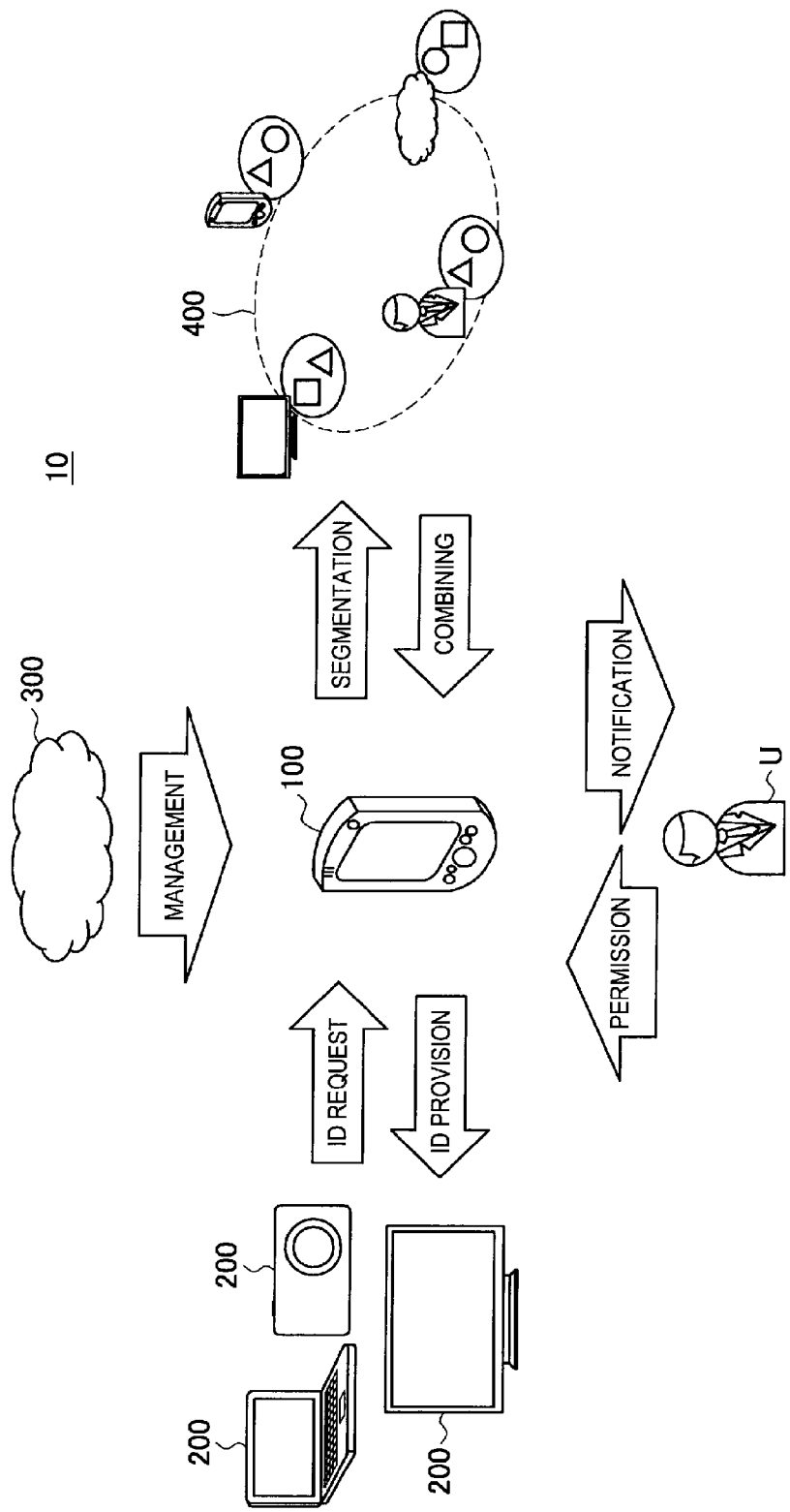

[Fig. 2]
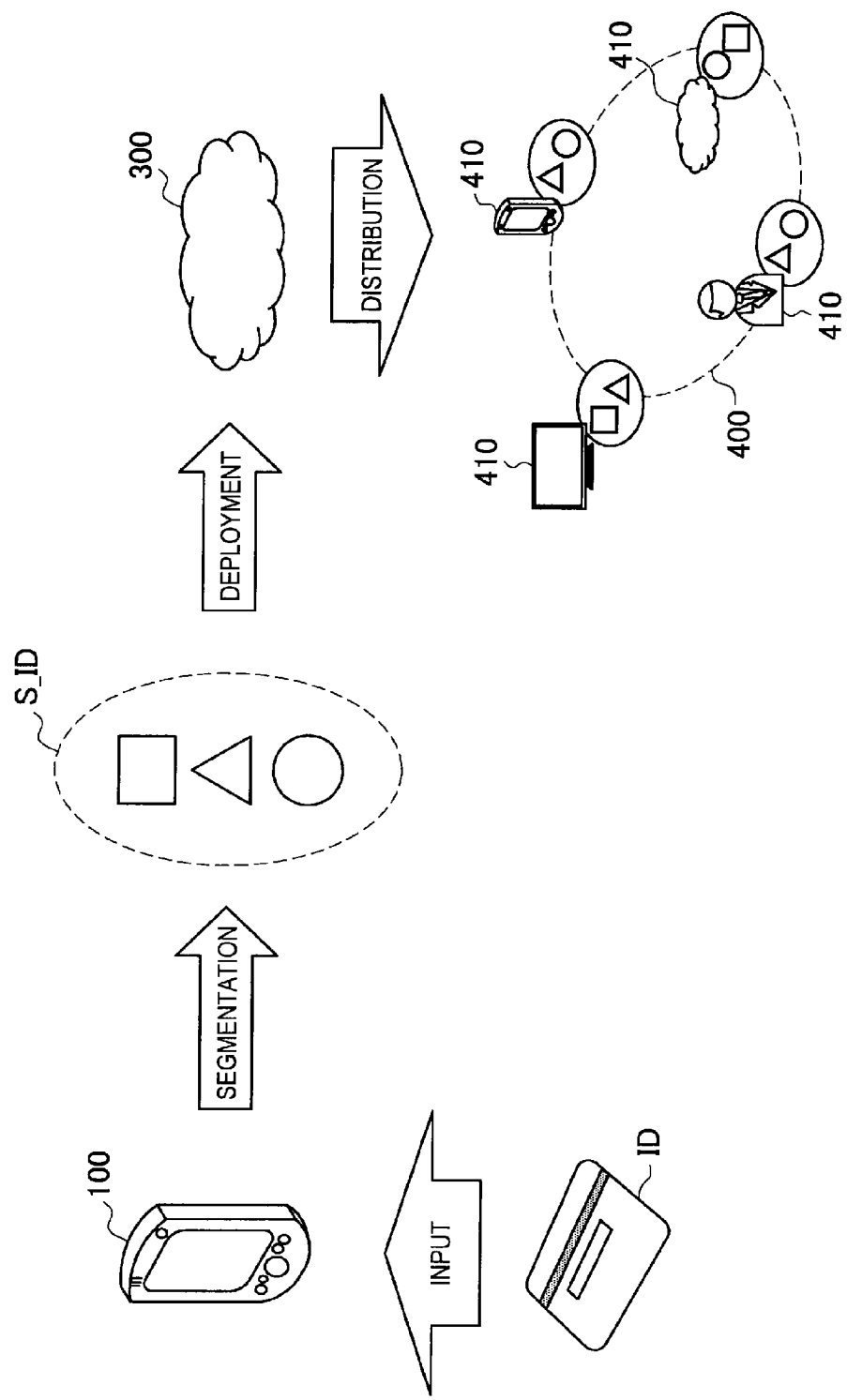

[Fig. 3]
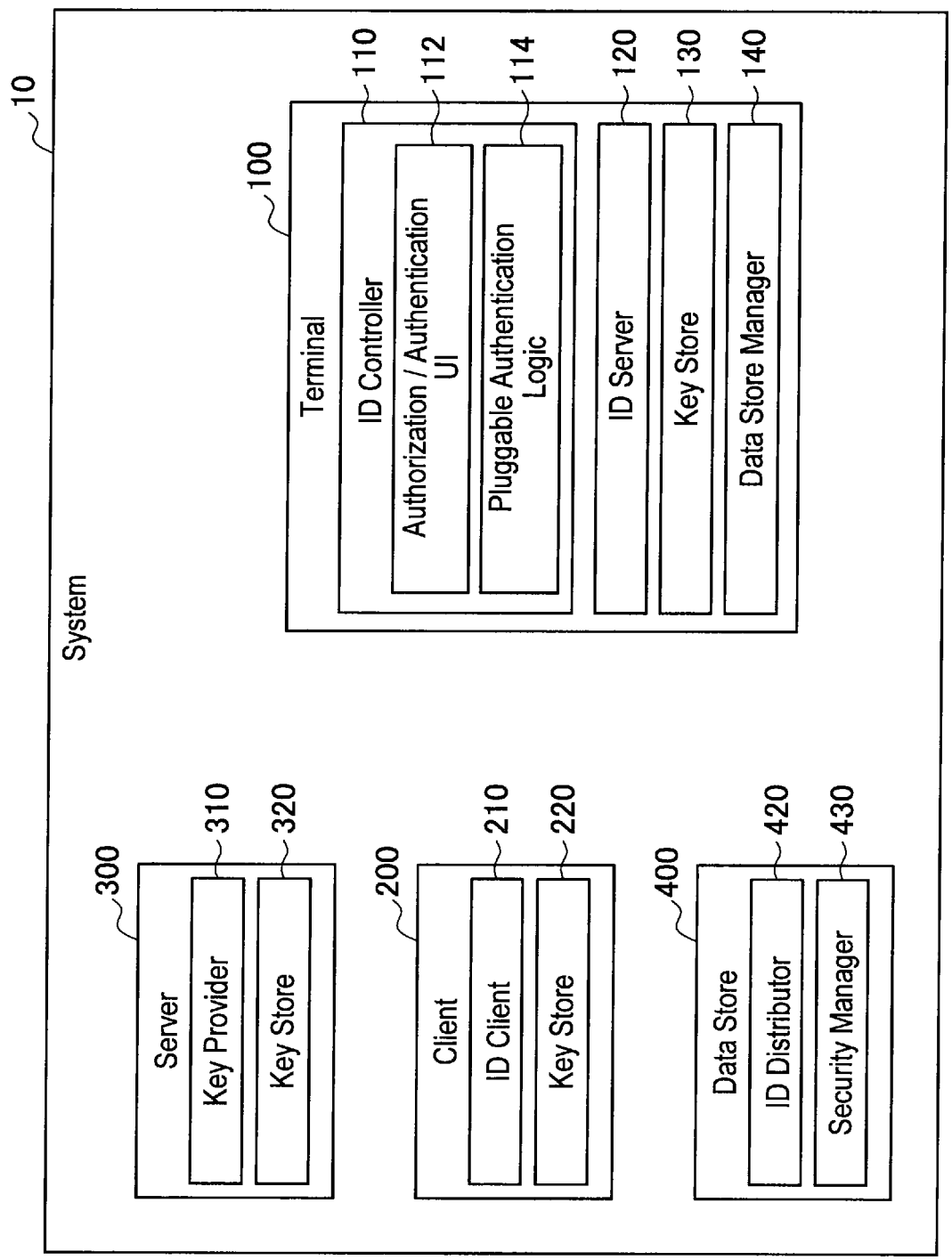

[Fig. 4]
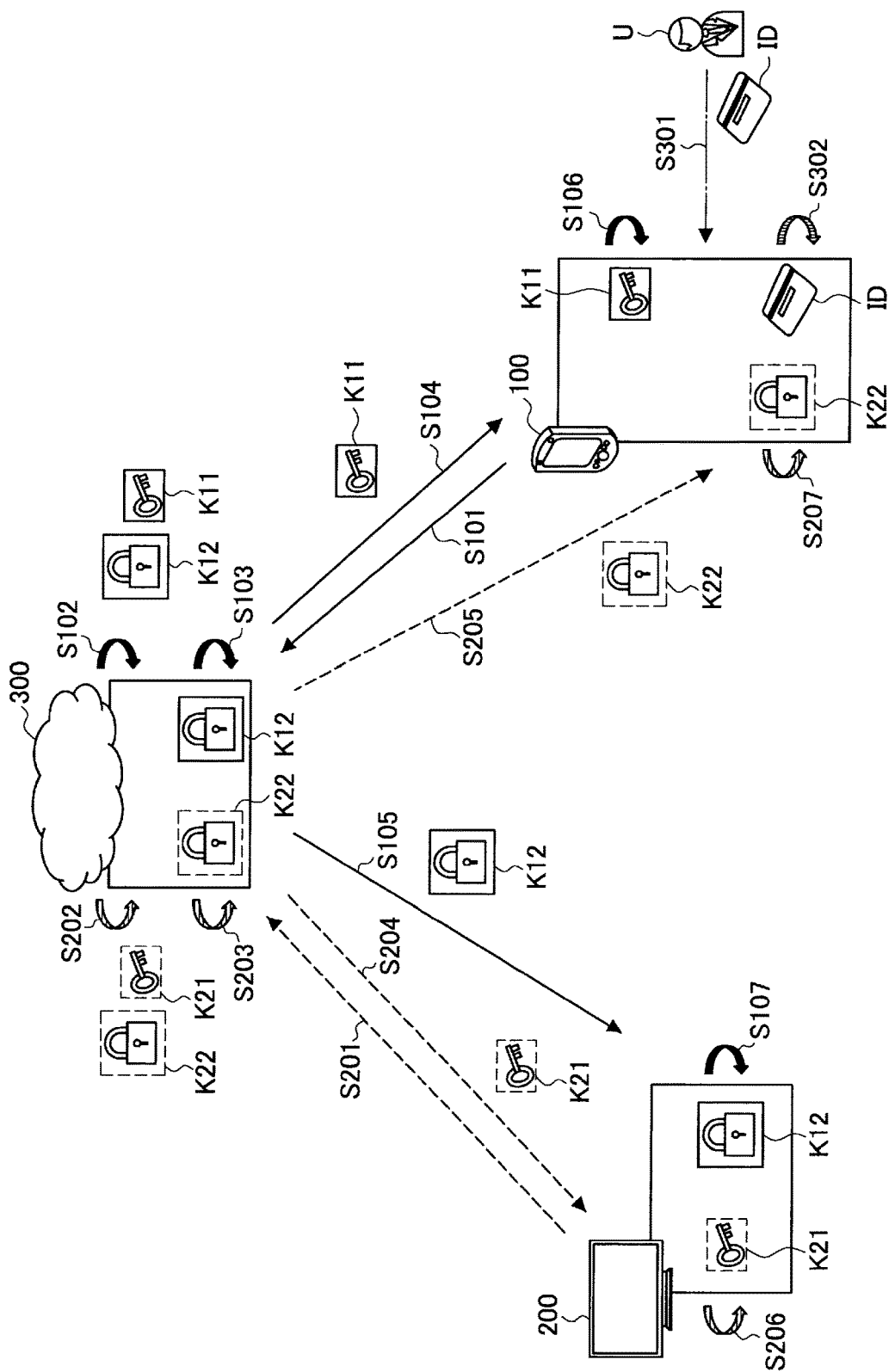

[Fig. 5]
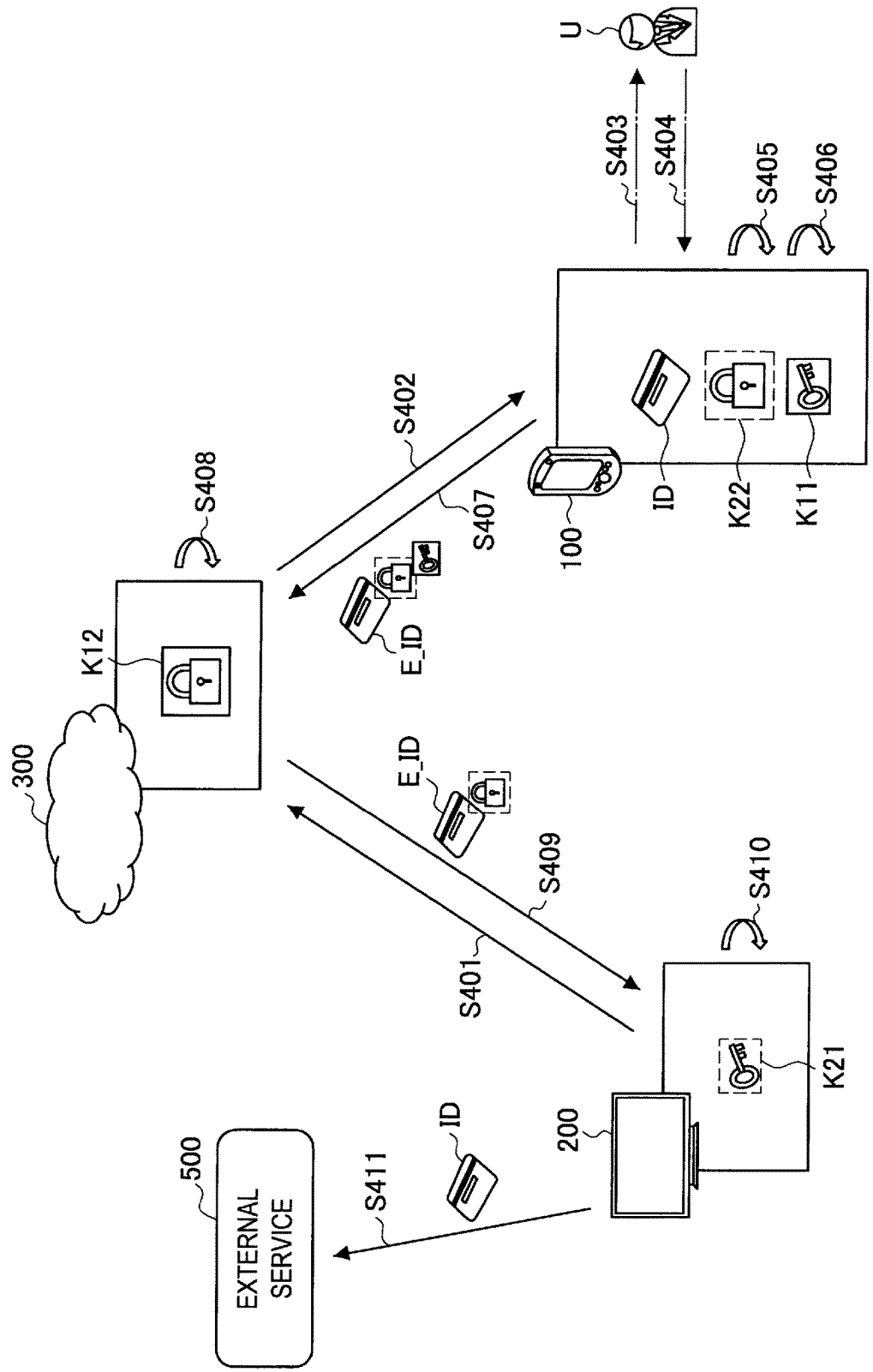

[Fig. 6]
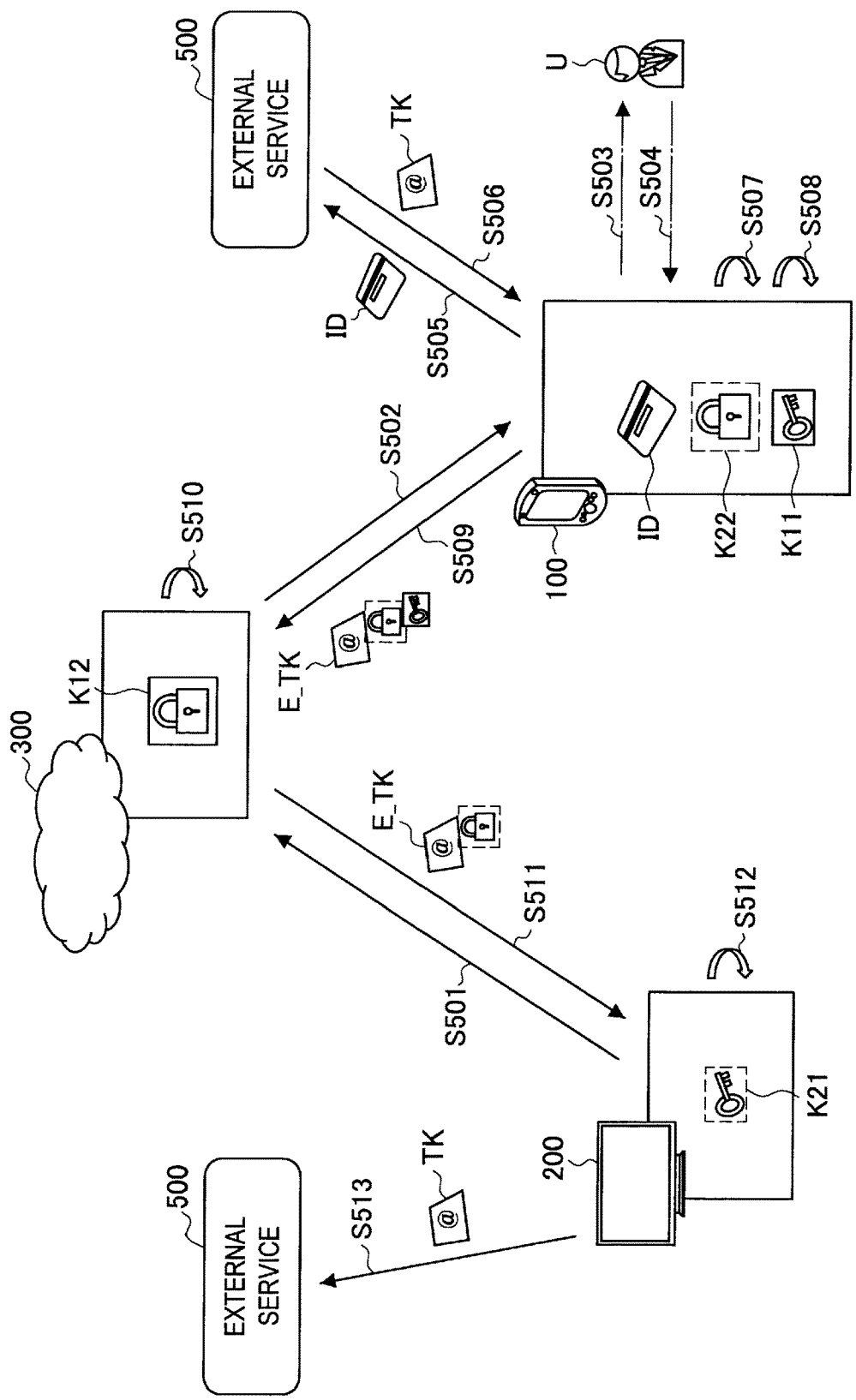

[Fig. 7]
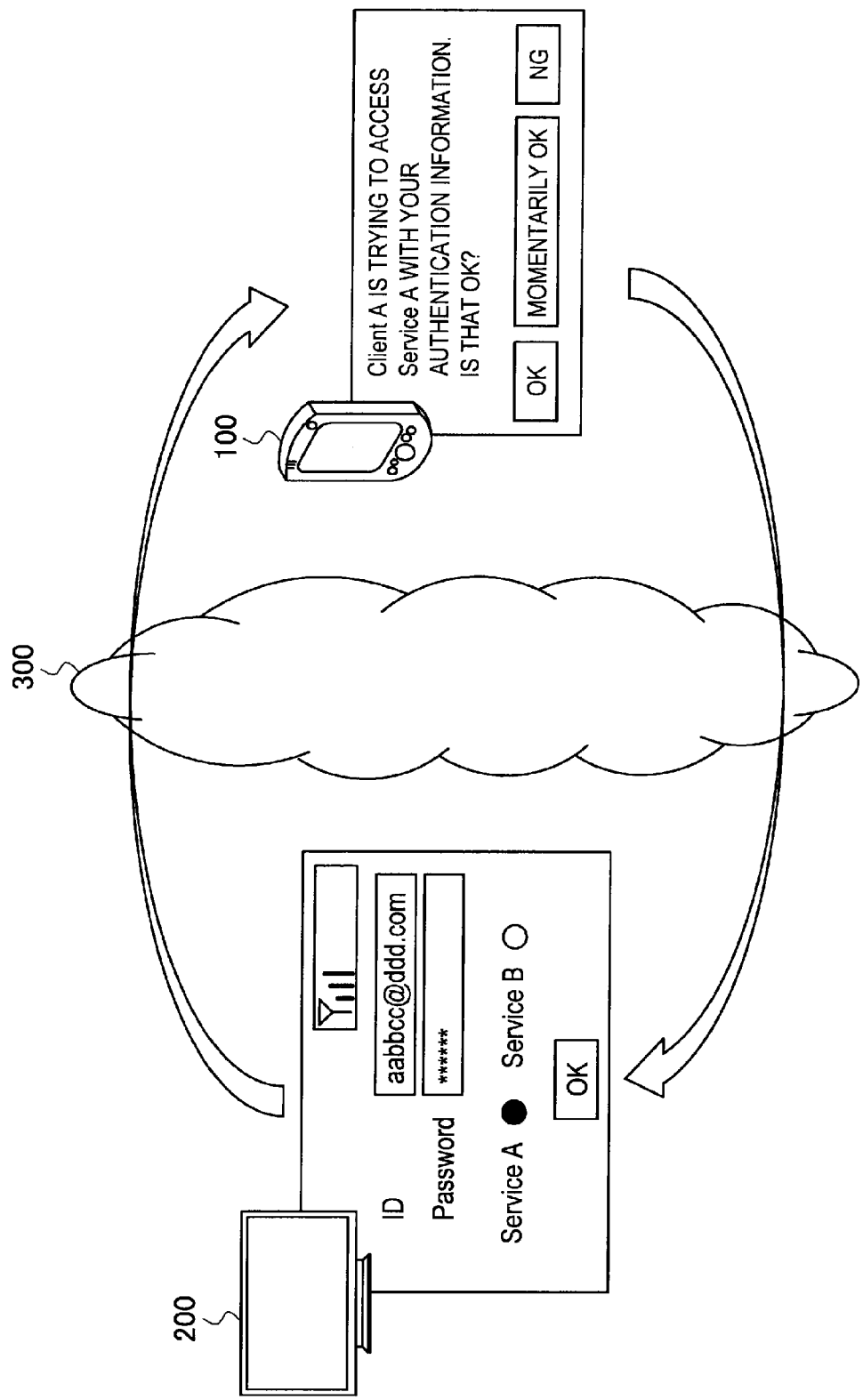

[Fig. 8]
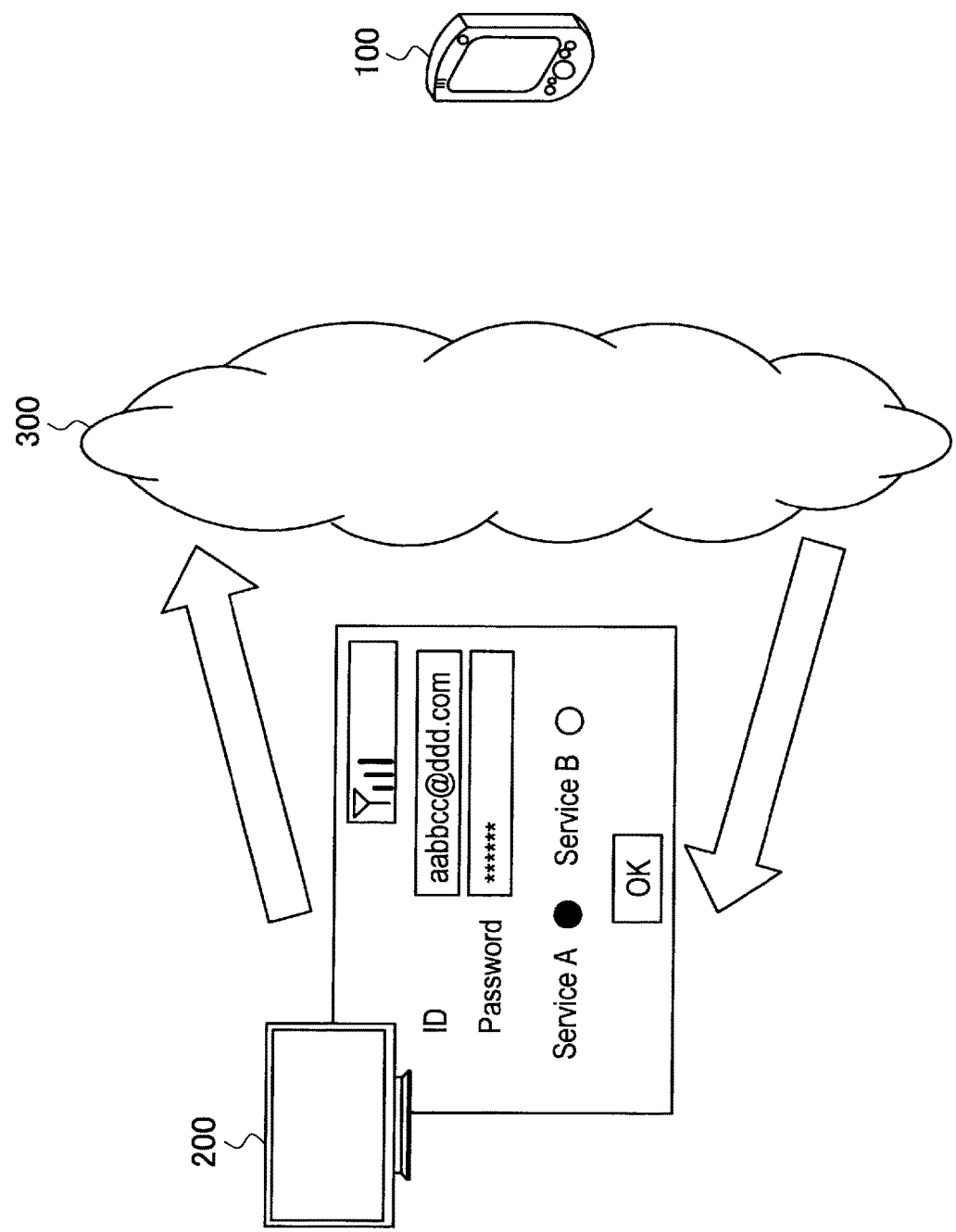

[Fig. 9]
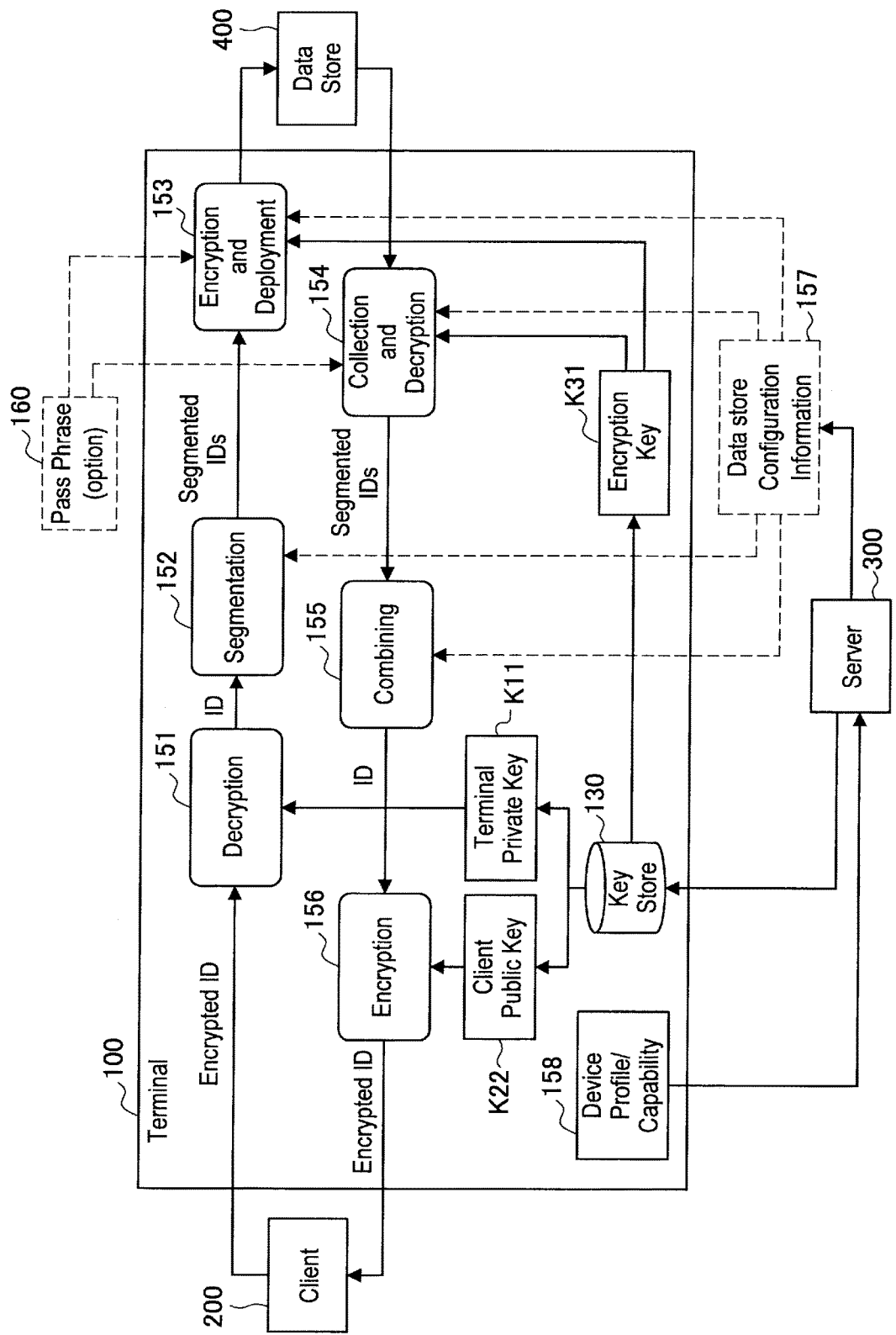

[Fig. 10]
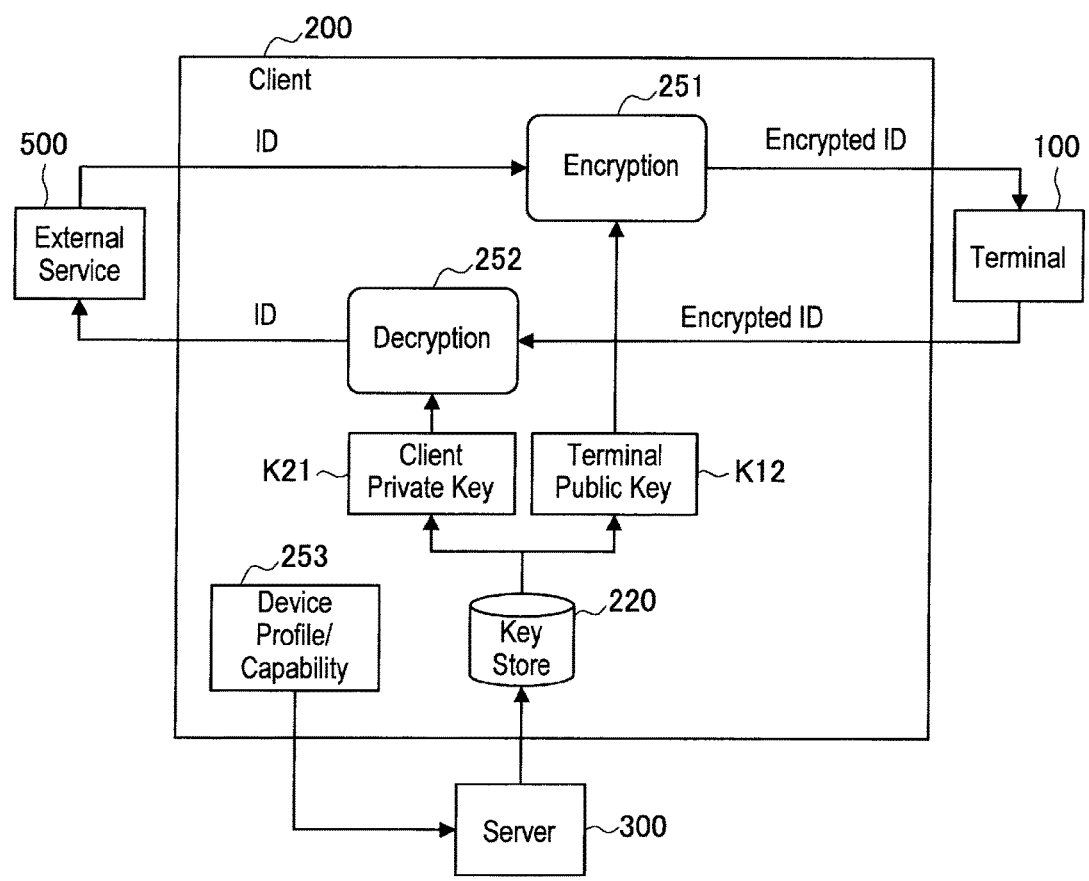

[Fig. 11]
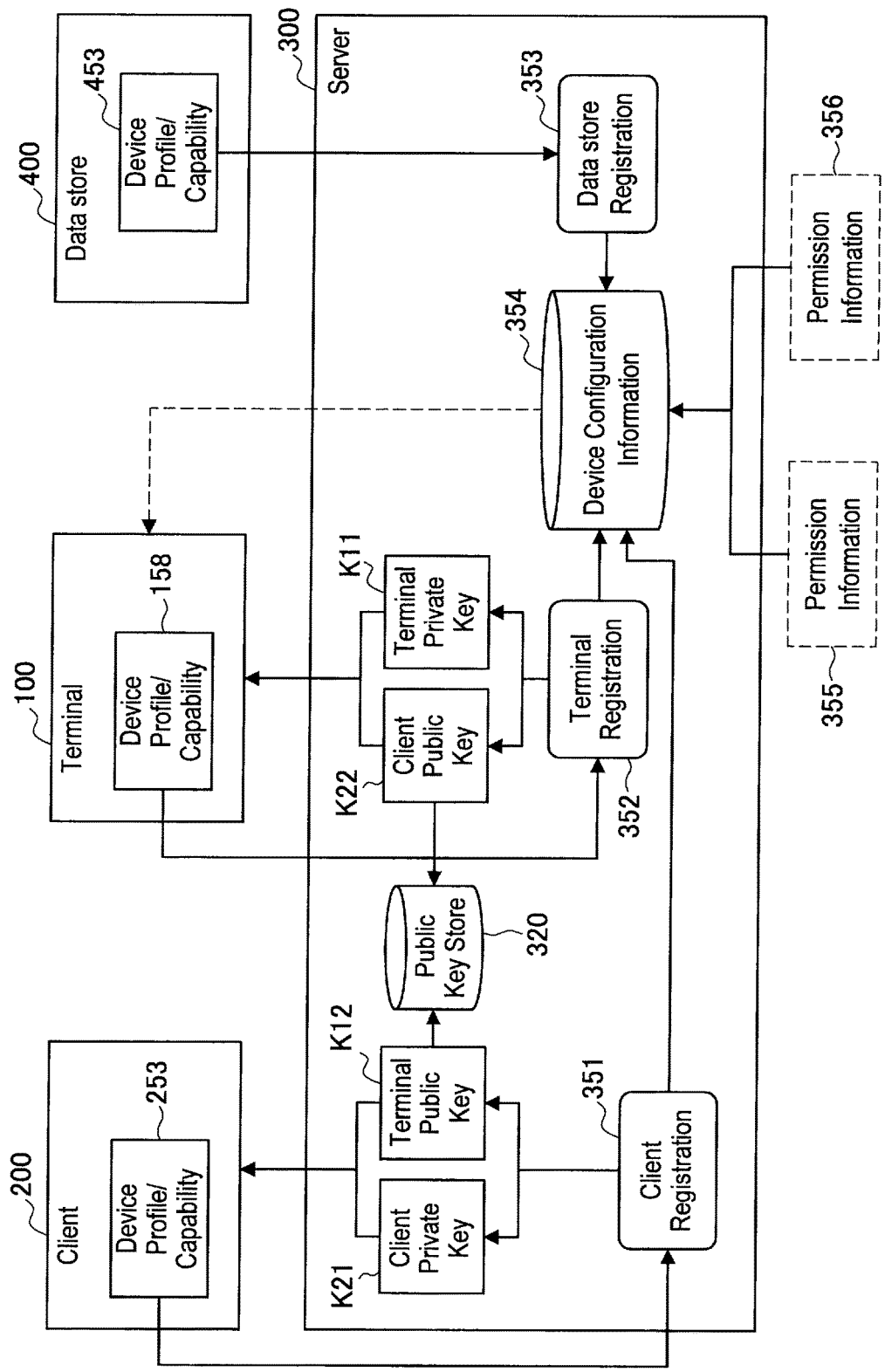

[Fig. 12]
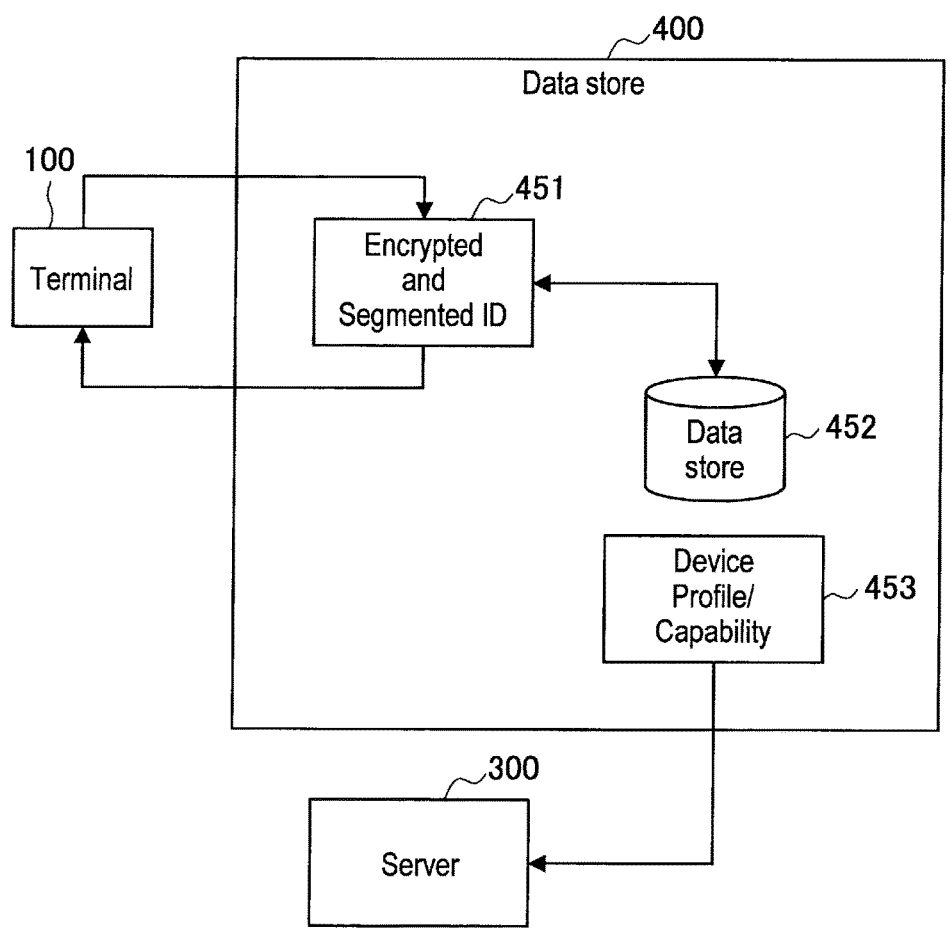

[Fig. 13]
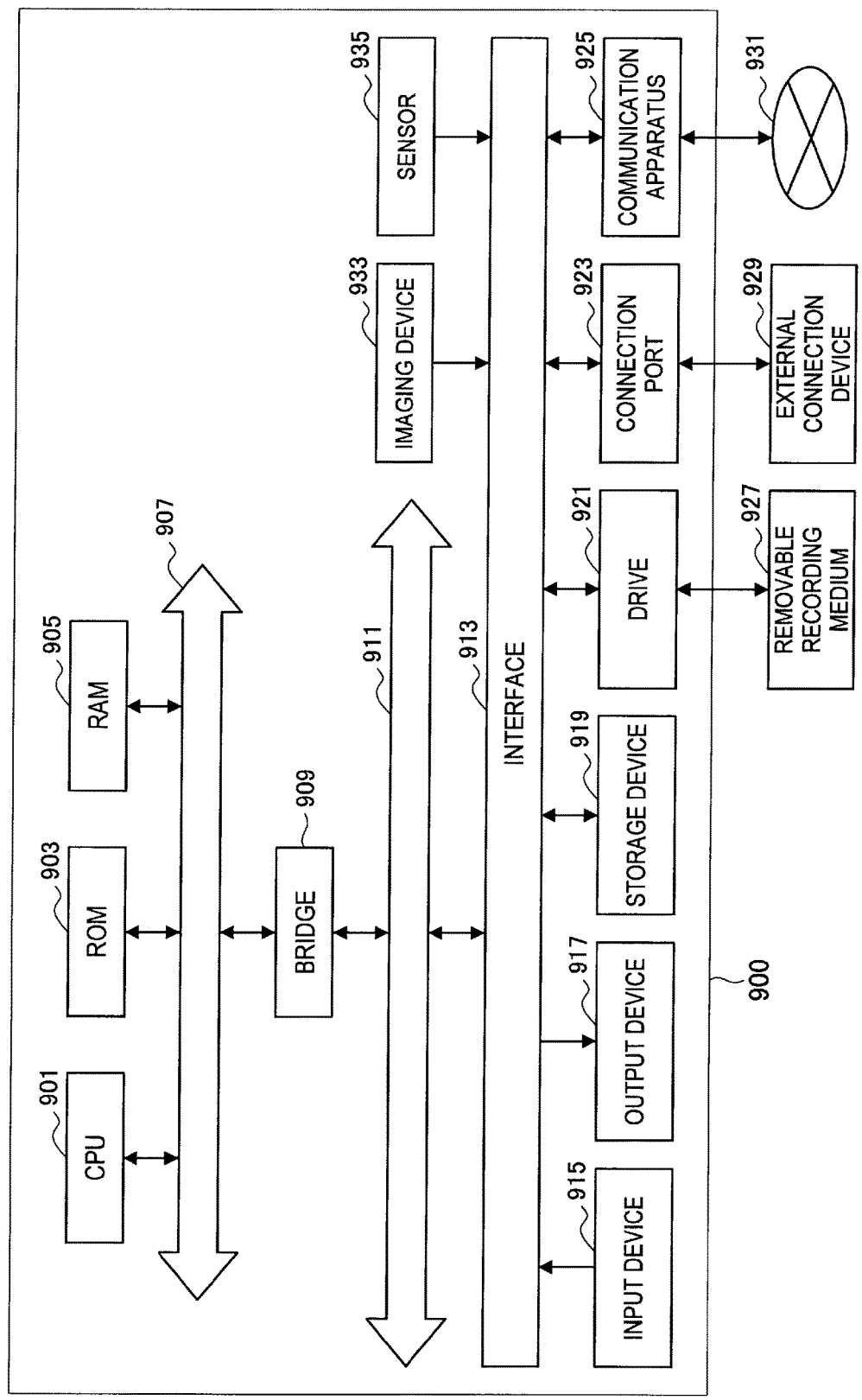

ACCESSING A SERVICE USING AN ENCRYPTED TOKEN

TECHNICAL FIELD

The present disclosure relates to a terminal device, an information processing system, an information processing method, and a program.

The present disclosure contains subject matter related to that disclosed in Japanese Priority Patent Application JP 2012-143953 filed in the Japan Patent Office on Jun. 27, 2012, the entire content of which is hereby incorporated by reference.

BACKGROUND ART

Services provided via a network, such as a SNS (social networking service), an image sharing service, a blog, an online streaming service and the like, are continuing to expand. In order to utilize a service, it is common for some kind of personal information from the user side to be transmitted. For example, for most services, the service is provided to users by identifying each user based on the input of an ID and a password. Further, some other personal information, such as an E-mail address, a name, or a telephone number, is sometimes transmitted in order to utilize a service.

Although the input of such information may be necessary for a user to safely use the service or to fully utilize the contents of the service, on the downside, this can also feel bothersome to the user. Accordingly, many technologies have been proposed to facilitate the input of information to be used in a service. For example, Patent Literature 1 describes a technology which, when utilizing a network to upload content such as an image or a video, facilitates such inputs by capturing a code image that includes ID and password information with a camera.

CITATION LIST

Patent Literature

PTL 1: JP 2009-282734A

SUMMARY

Technical Problem

As described above, services provided via a network are expanding, and it is common for users to utilize a plurality of services. The information that is registered about the users is different for each service. Consequently, the users input a different ID and password for each service, or transmit their personal information for each service. Even if the technology described above in Patent Literature 1, for example, does facilitate the input of information per se, the troublesomeness of inputting information when utilizing a service, for example, remains.

According to an embodiment of the present disclosure, provided are a novel and improved terminal device, information processing system, information processing method, and program, which are capable of improving a user's convenience when utilizing a service provided via a network.

Solution to Problem

An information processing apparatus includes a processor that includes a receiving unit that receives a request for user data related to an external service. The processor also includes a retrieving unit that retrieves segmented user data based on the request. A providing unit then combines the segmented user data to generate the user data related to the external service, and provides the user data related to the external service to a device from which the request was received.

An information processing method includes receiving, at a processor, a request for user data related to an external service, and retrieving, by the processor, segmented user data based on the request. The method also includes combining, at the processor, the segmented user data to generate the user data related to the external service, and providing, from the processor, the user data related to the external service to a device from which the request was received.

An information processing system includes a server that provides an external service, and a client device that accesses the external service. The system also includes a plurality of data storage units that store segmented user data, and a terminal device including a processor. The processor of the terminal device receives a request for user data related to the external service from the client device, and retrieves, from the plurality of data storage units, segmented user data corresponding to the user data related to the external service requested by the client device. Then the processor combines the segmented user data retrieved to form the user data related to the external service, and provides the user data related to the external service to the client device.

A non-transitory computer-readable medium is encoded with computer-readable instructions that, when executed by a computer, cause the computer to perform a method that includes receiving a request for user data related to an external service. The method also includes retrieving segmented user data based on the request, and combining the segmented user data to generate the user data related to the external service. Then the method provides the user data related to the external service to a device from which the request was received.

An information processing system includes a client device that accesses an external service using a token, and a terminal device that obtains the token from the external service based on a token acquisition request received from the client device via a server. The terminal device provides identification information to the external service to obtain the token. The terminal device then encrypts the token obtained from the external service to form an encrypted token and transmits the encrypted token to the client device. The client device decrypts the encrypted token to obtain the token and provides the token to the external service to access the external service.

Thus, when a client device accesses a service, if user-related information acquired by a terminal device can be utilized based on a request to the terminal device, since the user-related information does not have to be input by or stored in the client device, user convenience is improved.

Advantageous Effects of Invention

According to an embodiment of the present disclosure as described above, a user's convenience when utilizing a service provided via a network can be improved.

BRIEF DESCRIPTION OF DRAWINGS

FIG. 1 is a diagram that schematically illustrates a system configuration according to an embodiment of the present disclosure.

FIG. 2 is a diagram illustrating utilization of a data store according to an embodiment of the present disclosure.

FIG. 3 is a diagram that schematically illustrates a function configuration according to an embodiment of the present disclosure.

FIG. 4 is a diagram illustrating a processing flow of advance processing according to an embodiment of the present disclosure.

FIG. 5 is a diagram illustrating a processing flow of ID provision processing according to an embodiment of the present disclosure.

FIG. 6 is a diagram illustrating a processing flow of token provision processing according to an embodiment of the present disclosure.

FIG. 7 is a diagram illustrating an example of a utilization mode when a terminal device is online according to an embodiment of the present disclosure.

FIG. 8 is a diagram illustrating an example of a utilization mode when a terminal device is offline according to an embodiment of the present disclosure.

FIG. 9 is a diagram illustrating an example of a data flow in a terminal device according to an embodiment of the present disclosure.

FIG. 10 is a diagram illustrating an example of a data flow in a client device according to an embodiment of the present disclosure.

FIG. 11 is a diagram illustrating an example of a data flow in a server according to an embodiment of the present disclosure.

FIG. 12 is a diagram illustrating an example of a data flow in a data store according to an embodiment of the present disclosure.

FIG. 13 is a block diagram illustrating a hardware configuration of an information processing device.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be carried out in the following order.
1. Introduction
2. System Configuration
3. Function Configuration
4. Processing Flow Examples
4-1. Advance Processing
4-2. When Providing an ID to the Client Device
4-3. When Providing a Token to the Client Device
5. Utilization Mode Examples
5-1. When a Terminal Device is Online
5-2. When a Terminal Device is Offline
6. Data Flow
7. Embodiment Summary
8. Hardware Configuration
9. Supplement (1. Introduction)

The fact that when a user utilizes a plurality of services, he/she may need to input a different ID or password for each service and transmit personal information to each service has already been described above. In some cases the operation for such inputs feels bothersome to the user.

One method of resolving this problem would be to provide a service (hereinafter referred to as service S) that comprehensively manages a user's personal information. For example, the service S can be accessed using an arbitrary service ID and password that are registered for utilization. When the user utilizes other services via service S, since service S stores the IDs and passwords, the user does not have to input different IDs and passwords for each service.

However, there are also difficulties in realizing such a service S. For example, if information was leaked from the server providing service S due to unauthorized access, the IDs and passwords for various services would be leaked all at once. Further, since each of the other services would store an ID and a password allowing access to service S, there is also the possibility that service S could be subjected to unauthorized access via these other services.

Further, even if service S's security were perfect, the fact that a user's own personal information is managed by the server may not be, at least for some users, desirable.

Accordingly, according to an embodiment of the present disclosure, a technology is proposed that improves on such technology, and is capable of being both technologically safe and providing a sense of security for the user.

(2. System Configuration)

First, a system configuration according to an embodiment of the present disclosure will now be described with reference to FIG. 1. FIG. 1 is a diagram that schematically illustrates a system configuration according to an embodiment of the present disclosure.

A system 10 includes a terminal device 100, a client device 200, a server 300, and a data store 400.

The system 10 can be used by the client device 200 to access an external service using the ID and password of a user U. Note that in the following description to distinguish from a service that is provided by the system 10 itself, a service accessed by the client device 200 will be referred to as an external service. Examples of external services include an SNS (social networking service), an image sharing service, a blog, an online streaming service and the like.

The client device 200 (the user) trying to access the external service makes a request (ID request) to the terminal device 100 (authenticated station) for information about the ID and password. The terminal device 100 receives this request, and notifies the user U that the request has been received. If the user U wishes to allow access to the external service by the client device 200, the user U gives permission to this notification.

The terminal device 100 receives this permission, and combines the information about the ID and the password that are distributed and stored in the data store 400. In addition, the terminal device 100 provides the combined information to the client device 200 (ID provision). Consequently, the client device 200 can access the external service using the ID and password.

On the other hand, the server 300 does not directly participate in the above-described exchange of the ID and the password. The server 300 manages the terminal device 100, the client device 200, and the data store 400. The term "management" as used here may include grasping the presence of each device, the establishment of a secure communication path between devices and the like.

Namely, in the system 10, by directly managing IDs and passwords with the terminal device 100, leakage of information about the IDs and passwords can be prevented even if the server 300 is subjected to unauthorized access. Further, even if the client device 200 tries to access an external service against the user U's wishes, the user U is aware of this situation due to a notification from the terminal device 100, and can block access by not giving permission.

Although ID and password information may be stored in the terminal device 100, security can be increased by distributing and storing this information in the data store 400. According to an embodiment of the present disclosure, the terminal device 100 segments the acquired external service ID and password, and distributes and stores them in the data store 400. The utilization of this data store 400 will now be described further with reference to FIG. 2.

(Data Store Configuration)

FIG. 2 is a diagram illustrating utilization of a data store according to an embodiment of the present disclosure. First, an ID is input into the terminal device 100. Here, this "input" may be a direct input by the user U, or an input that is based on the terminal device 100 receiving information about the ID and the like issued from an external service. Further, for simplicity, in the following description ID and password may sometimes be collectively referred to as ID.

The terminal device 100 segments the input ID into S_IDs (segmented IDs). Further, the terminal device 100 deploys a S_ID at each node 410 that functions as a data store 400. The terminal device 100 can also ask the server 300 to execute this deployment. The server 300 distributes a part of each S_ID to each node 410. Note that during this operation too, the S_ID is encrypted using a public key of the distribution destination node 410, for example. The ID cannot be acquired at the server 300 by combining the S_IDs.

The nodes 410 are various units for storing a portion of the ID. According to an embodiment of the present disclosure, the data store 400 includes a plurality of nodes 410. Even if some of the nodes node 410 are accessed in an unauthorized manner, the person who gained access merely acquires a portion of the S_ID, which prevents the acquired information from being used. Examples of a node 410 will be illustrated below. The node 410 may be any or all of these examples.

Storage Unit that Each Device has

The device may be a mobile device or a stationary device. For example, the terminal device 100, the client device 200, and even the server 300 can function as a node 410. A portion of the S_ID is stored in a storage unit that is in each device functioning as a node 410.

External Service

A portion of the S_ID is stored in an external service server that is not included in the system 10, for example.

IC (Integrated Chip) Card

A portion of the S_ID is written on an IC card possessed by the user U, for example. When the ID is acquired by combining the S_IDs, the S_ID portion is read from this IC card. Alternatively, the reading of information from a predetermined IC card may be set as a condition for combining the S_IDs.

User Behavior

A portion of the S_ID may be associated with, for example, some kind of behavior by the user U. For example, a portion of the S_ID may be replaced with a PIN (personal identification number) code or the like that is input by the user U. Further, a portion of the S_ID may also be replaced with the position information about the user U or an action by the user U (e.g., standing up/sitting down at a predetermined position etc.). In this case, for example, a portion of the S_ID is extracted from the result of sensing the user U's position information or action. Alternatively, an input of biological information about the user U may be set as a condition for combining the S_IDs.

Note that at the data store 400, the S_ID distribution level, namely, how finely the ID is to segmented to produce the S_IDs, can be determined based on a setting by the user U. For example, if the S_IDs are produced by finely segmenting the ID, even if for some reason another person acquires a portion of a S_ID, the possibility of that other person obtaining the ID from that is reduced further. On the other hand, if finely segmented S_IDs are distributed and stored in a large number of nodes 410, if for some reason the S_IDs are not acquired from some of the nodes 410, it is difficult to acquire the ID by combining the S_IDs.

Further, at the data store 400, the S_ID deployment multiplicity, namely, how the S_ID is to be stored at each node 410, can be determined based on a setting by the user U. For example, if the S_ID deployment multiplicity is high, so that the same S_ID is stored in several nodes 410, even if for some reason the S_ID cannot be acquired from some of the nodes 410, the ID can be acquired by combining the S_IDs. However, because the number of nodes 410 that needs to be accessed in order to acquire the ID is low if the S_ID deployment multiplicity is high, the chances of unauthorized access by another person increase compared with when multiplicity is low.

The server 300 can manage the nodes 410 and provide the user U via the terminal device 100 with information about what kind of settings the user U can set for the S_ID distribution level and deployment multiplicity in the manner described above, for example. Further, the server 300 can enable the setting of which node 410 is to be utilized by presenting the user U with information about the nodes 410 being managed.

(3. Function Configuration)

Next, a function configuration according to an embodiment of the present disclosure will be described with reference to FIG. 3. FIG. 3 is a diagram that schematically illustrates a function configuration according to an embodiment of the present disclosure.

The terminal device 100 includes an ID controller 110, an ID server 120, a key store 130, and a data store manager 140. The ID controller 110 includes an authorization/authentication UI (user interface) 112 and a plug-in authentication logic 114. These function configurations are realized using an information processing device hardware configuration like that described below, for example.

The terminal device 100 may be a PC (personal computer) or one of various devices carried around by the user U, such as a smartphone. Further, other than the functions described below, the terminal device 100 can also have a function configuration (not illustrated) as found in an ordinary PC or a smartphone, for example.

The authorization/authentication UI 112 notifies the user U that an ID utilization request has been received from the client device 200, and acquires the user U's permission to provide the ID indicated by that notification. The authorization/authentication UI 112 may be provided as a UI that works in cooperation with a web browser.

The plug-in authentication logic 114 is an authentication logic that supports each of the authentication protocols of the external services utilized via the client device 200. The plug-in authentication logic 114 can acquire the ID to be used by each external service. According to an embodiment of the present disclosure, the plug-in authentication logic 114 acquires the ID from the data store 400 via the data store manager 140 based on the ID request from the client device 200, and provides the ID to the client device 200 via the ID server 120. During this process, the plug-in authentication logic 114 acquires the user U's permission to provide the ID via the authorization/authentication UI 112.

Alternatively, the plug-in authentication logic 114 can access an external service using its own ID and acquire a token for utilizing the external service. The acquired token is provided to the client device 200 via the ID server 120. According to an embodiment of the present disclosure, the token enables access to the external service for a predetermined period. Acquiring this token and providing it to the client device 200, for example, eliminates the need to directly provide the ID to the client device 200, so that security when utilizing the ID is further improved. Further, during the period that the token is valid, the external service can be accessed by the client device 200 even if the terminal device 100 seems to be offline, for example.

The ID server 120 provides the appropriate ID to the client device 200 based on the ID request from the client device 200. The ID server 120 asks the plug-in authentication logic 114 to acquire the ID based on the received ID request. If the user U's permission has been obtained by the authorization/authentication UI, the ID is provided from the plug-in authentication logic 114, and the ID server 120 provides this to the client device 200.

The key store 130 stores the keys to the codes used by the terminal device 100. As described below, according to an embodiment of the present disclosure, in which a public key cryptosystem is used, the key store 130 stores a public key to each client device 200 and a private key to the terminal device 100 itself. The ID server 120 transmits an ID encrypted using the public key to the client device 200 that is stored by the key store 130 to the client device 200. Further, the ID server 120 decrypts the ID request encrypted using the public key to the terminal device 100 stored by the client device 200 using the terminal device 100's own private key stored by the key store 130.

The data store manager 140 manages the IDs that are distributed and stored in the data store 400. For example, the data store manager 140 segments the ID into S_IDs, and deploys the S_IDs at the nodes 410 of the data store 400. Further, the data store manager 140 acquires the ID by combining the S_IDs distributed across the nodes 410 of the data store 400, and provides the acquired ID to the plug-in authentication logic 114. The data store manager 140 may also manage the ID based on information about the data store 400 and the nodes 410 provided from the server 300.

(Client Device)

The client device 200 includes an ID client 210 and a key store 220. These function configurations are realized using an information processing device hardware configuration like that described below, for example.

The client device 200 may be a variety of devices capable of utilizing a service on a network, such as a PC, a camera, or a television. Further, the client device 200 may have an ordinary (not illustrated) configuration for a function (e.g., a function relating to display or imaging) that utilizes a service.

The ID client 210 transmits an ID acquisition request or a representative authentication request to the terminal device 100 when the client device 200 tries to utilize an external service. The ID client 210 transmits the request to the terminal device 100 based on information provided from the server 300.

The key store 220 stores an encryption key that is used by the client device 200. As described below, according to an embodiment of the present disclosure, in which a public key cryptosystem is used, the key store 220 stores a public key to the terminal device 100 and a private key to the client device 200 itself. The ID client 210 transmits an ID request encrypted using the public key to the terminal device 100 that is stored by the key store 220 to the terminal device 100. Further, the ID client 210 decrypts the ID encrypted using the public key to the client device 200 stored by the terminal device 100 using the client device 200's own private key stored by the key store 220.

(Server)

The server 300 includes a key provider 310 and a key store 320. These function configurations are realized using an information processing device hardware configuration like that described below, for example.

The function of the server 300 may be provided by a single device on a network, or may be provided by a plurality of devices working together. It is not necessary for the server 300 to only provide the below-described function. Namely, the server 300 can provide the below-described function as one function of a predetermined service.

The key provider 310 stores an encryption key that is used by the terminal device 100 and the client device 200. As described below, according to an embodiment of the present disclosure, in which a public key cryptosystem is used, the key provider 310 generates a pair of a private key and a public key for the terminal device 100 and a pair of a private key and a public key for the client device 200. The server 300 provides the generated encryption key to the terminal device 100 and the client device 200, respectively. Specifically, a private key to the terminal device 100 and a public key to the client device 200 are provided to the terminal device 100, and a private key to the client device 200 and a public key to the terminal device 100 are provided to the client device 200.

Here, among the generated keys, the key provider 310 discards the private keys to the terminal device 100 and the client device 200 after they have been provided to the respective devices. Consequently, the ID request and the ID content that are exchanged between the terminal device 100 and the client device 200 are not read at the client device 200. Therefore, even if the server 300 were subjected to unauthorized access, the ID request and the ID content would not be known by a third party.

On the other hand, among the generated keys, the key provider 310 may store the public keys to the terminal device 100 and the client device 200. Doing so has several advantages.

For example, as an additional configuration, the ID request transmitted from the client device 200 may be encrypted by the public key to the terminal device 100, and the encrypted ID request may be decrypted by the terminal device 100 using the private key. In this case, the server 300 cannot read what kind of ID request was transmitted from the client device 200. Further, the ID encrypted by the public key to the client device 200 may also be further encrypted by the private key to the terminal device 100, and this doubly-encrypted ID may be decrypted using the public key stored in the server 300. In this case, a determination can be made regarding whether the terminal device 100 that transmitted the ID is being impersonated.

Further, for example, when a client device 200 is newly added, if a public key to the terminal device 100 is stored, even if the terminal device 100 appears to be offline, for example, the public key to the terminal device 100 can be provided to the new client device 200. Conversely, when a terminal device 100 has been added or replaced, if a public key to each client device 200 is stored in the server 300, even without making an inquiry to each client device 200, the public key to the client devices 200 can be provided to the new terminal device 100.

(Data Store)

The data store 400 includes an ID distributor 420 and a security manager 430. If the node 410 is a storage unit in a device or an external service, these function configurations are realized using an information processing device hardware configuration like that described below, for example. Alternatively, if the node 410 is an IC card, a user's behavior or the like, these function configurations are realized using an information processing device hardware configuration like that described below, for example, in a device that communicates with the IC card or senses the user's behavior.

The ID distributor 420 distributes and stores the segmented ID (S_IDs) based on an instruction from the data store manager 140 in the terminal device 100. For example, if the S_IDs are to be stored in the storage unit of a device, the ID distributor 420 stores the S_IDs whose deployment was requested from the data store manager 140 in the storage unit, and the S_IDs are read based on a request from the data store manager 140. Further, for example, if the S_IDs are to be stored by an IC card or a user's behavior, the ID distributor 420 writes the S_IDs whose deployment was requested from the data store manager 140 in the IC card or replaces the S_IDs with the user's behavior. In this case, based on the request from the data store manager 140, the ID distributor 420 transmits a request to the user to read the information from the IC card or to execute some kind of behavior.

Based on processing suited to each of the nodes 410 included in the data store 400, the security manager 430 ensures the security of the stored S_IDs. For example, when storing the S_IDs in a device's storage unit, the security manager 430 stores the S_IDs in an encrypted state in the storage unit. Further, for example, when storing the S_IDs by an IC card or a user's behavior, the security manager 430 writes the S_IDs in an encrypted state in the IC card, or replaces the user's behavior in a way that cannot be easily guessed.

(4. Processing Flow Examples)

Next, examples of the processing flow according to an embodiment of the present disclosure will be described with reference to FIGS. 4 to 6. Note that the respective processing steps do not have to be executed in the below-described order. At least some of these processing steps may be executed in parallel or in a different order.

(4-1. Advance Processing)

FIG. 4 is a diagram illustrating a processing flow of advance processing according to an embodiment of the present disclosure. In advance processing, the terminal device 100 and the client device 200 are each registered in the server 300. Further, in the terminal device 100, an ID is registered by the user U.

(Terminal Device Registration Processing)

First, the registration processing of the terminal device 100 (steps S101 to S107) will be described. The terminal device 100 transmits a registration request to the terminal device 100 (step S101). This can also be said to be a request for the registration of the terminal device 100 as an ID authenticated station in the system 10. Based on this request, the server 300 registers the terminal device 100 as an authenticated station. Here, the server 300 may also register information about a secure communication path to the terminal device 100, for example.

Further, the server 300 issues an encryption key pair (private key K11 and public key K12) for the authenticated station (step S102). Of the issued pair of keys, the server 300 stores the public key K12 (step S103). On the other hand, the server 300 transmits the private key K11 to the terminal device 100 and requests that it be stored (step S104), and then discards the private key K11. In addition, the server 300 transmits the public key K12 to the client device 200 (which has already been registered based on the below-described processing) and requests that it be stored (step S105).

The terminal device 100 receives the private key K11 from the server 300, and stores the private key K11 (step S106). Further, the client device 200 also receives the public key K12 from the server 300, and stores the public key K12 (step S107). If the client device 200 is to be registered after the terminal device 100, the respective processing steps performed in steps S105 to S107 are executed after registration of the client device 200. As described above, since the public key K12 is stored in the server 300, the public key K12 can be easily distributed even when the client device 200 is read later. With that, the registration processing of the terminal device 100 is finished.

(Client Device Registration Processing)

Next, the registration processing of the client device 200 (steps S201 to S207) will be described. The client device 200 transmits a registration request to the server 300 (step S201). This can also be said to be a request for the registration of the client device 200 as the user of the ID in the system 10. Based on this request, the server 300 registers the client device 200 as a user. Here, the server 300 may also register information about a secure communication path to the client device 200, for example.

Further, the server 300 issues an encryption key pair (private key K21 and public key K22) for the user (step S202). Of the issued pair of keys, the server 300 stores the public key K22 (step S203). On the other hand, the server 300 transmits the private key K21 to the client device 200 and requests that it be stored (step S204), and then discards the private key K21. In addition, the server 300 transmits the public key K22 to the terminal device 100 (which has already been registered based on the above-described processing) and requests that it be stored (step S205).

The client device 200 receives the private key K21 from the server 300, and stores the private key K21 (step S206). Further, the terminal device 100 also receives the public key K22 from the server 300, and stores the public key K22 (step S207). If the terminal device 100 is to be registered after the client device 200, the respective processing steps performed in steps S205 to S207 are executed after registration of the terminal device 100. As described above, since the public key K22 is stored in the server 300, the public key K12 can be easily distributed even when the terminal device 100 is read later. With that, the registration processing of the client device 200 is finished.

(ID Registration Processing)

Lastly, ID registration processing at the terminal device 100 (steps S301 and S302) will be described. As described above, the ID can include an ID and a password. The ID may also be referred to as authentication information that is used for authenticating the user U by an external service accessed by the client device 200. The ID is input into the terminal device 100 based on an input by the user U (step S301). Here, this input may be, for example, a direct input by the user U, or an input that is based on the terminal device 100 receiving information about the ID and the like issued from the external service.

Next, the ID is stored by the terminal device 100 (step S302). Here, this ID storage may be carried out by, for example, encrypting segmented IDs (S_IDs), and distributing and storing the encrypted S_IDs in the data store 400 (which is not illustrated in FIG. 4). With that, the registration processing of the terminal device 100 is finished. Note that, as explained here, the registered ID is not transmitted to either the server 300 or the client device 200 at the advance processing stage. Therefore, the ID registration can be executed at an arbitrary timing regardless of, for example, whether the terminal device 100 has already been registered in the server 300 as an authenticated station or not (and obviously, regardless of whether the client device 200 has been registered in the server 300 as a user).

(4-2. When Providing an ID to the Client Device)

FIG. 5 is a diagram illustrating a processing flow of ID provision processing according to an embodiment of the present disclosure. In ID provision processing, the client device 200 transmits a request to the terminal device 100 to provide an ID in order to utilize an external service 500, and the terminal device 100 obtains permission from the user U and provides the ID to the client device 200.

First, the client device 200 transmits an ID utilization request to the server 300 (step S401). The server 300 transfers the ID utilization request to the terminal device 100 (step S402). Note that this ID utilization request may be transmitted in plain text or encrypted in an arbitrary format. For example, the client device 200 can encrypt the ID utilization request using the stored public key 12, and transmit the encrypted request to the server 300. In this case, the ID utilization request is decrypted using the private key K11 corresponding to the public key K12 stored by the terminal device 100.

The terminal device 100 receives the ID utilization request, and outputs a notification about the ID utilization request to the user U (step S403). The user U confirms this notification, and if/she authorizes utilization of the ID, the user U inputs permission of the ID utilization (step S404). If ID utilization is permitted, the terminal device 100 encrypts the ID with the public key K22 (corresponding to the private key K21 stored by the client device 200) (step S405). The terminal device 100 may also further encrypt the ID encrypted with the public key K22 using its own private key K21 (step S406). Note that the encrypted key will also be referred to below as E_ID.

The terminal device 100 transmits the E_ID to the server 300 (step S407). If the E_ID was encrypted using the private key K11, the server 300 decrypts the E_ID with the public key K12 (corresponding to the private key K11) (step S408). However, since the private key K21 corresponding to the public key 22 is discarded after being generated, the server 300 cannot acquire the ID by completely decrypting the E_ID. Further, according to an embodiment of the present disclosure, since the client device 200 also stores the public key K12, the decryption using the public key K12 can also be executed by the client device 200.

The E_ID is transmitted to the client device 200 in a state in which it has been encrypted by at least the public key K22 (step S409). The client device 200 decrypts the E_ID using its own private key K21 to acquire the ID (step S410). Using this ID, the client device 200 accesses the external service 500 (step S411).

(4-3. When Providing a Token to the Client Device)

FIG. 6 is a diagram illustrating a processing flow of token provision processing according to an embodiment of the present disclosure. In token provision processing, instead of the client device 200, the terminal device 100 acquires a token in order to utilize the external service 500. The acquired token is provided to and stored in the client device 200, thereby enabling access to the external service 500 for a predetermined period.

First, the client device 200 transmits a token acquisition request to the server 300 (step S501). The server 300 transfers the token acquisition to the terminal device 100 (step S502). Note that, similar to the ID utilization request in the above-described example, this token acquisition request may also be transmitted in plain text or encrypted in an arbitrary format.

The terminal device 100 receives the token acquisition request, and outputs a notification about the ID utilization request to the user U (step S503). The user U confirms this notification, and if/she authorizes utilization of the ID (acquisition of the token), the user U inputs permission of the ID utilization (step S504). If ID utilization is permitted, the terminal device 100 accesses the external service 500 using the stored ID (step S505), and acquires a token TK (step S506). The token TK acquisition processing performed in steps S505 and S506 can be the same as token TK acquisition processing that is normally provided by the external service 500, for example.

The terminal device 100 acquires the token TK, and then encrypts the token TK with the public key K22 (corresponding to the private key K21 stored by the client device 200) (step S507). The terminal device 100 may also further encrypt the token TK encrypted with the public key K22 using its own private key K21 (step S508). Note that the encrypted token will also be referred to below as E_TK.

The terminal device 100 transmits the E_TK to the server 300 (step S509). If the E_TK was encrypted using the private key K11, the server 300 decrypts the E_TK with the public key K12 (corresponding to the private key K11) (step S510). However, since the private key K21 corresponding to the public key 22 is discarded after being generated, the server 300 cannot acquire the token TK by completely decrypting the E_TK. Further, since the client device 200 also stores the public key K12, the decryption using the public key K12 can also be executed by the client device 200.

The E_TK is transmitted to the client device 200 in a state in which it has been encrypted by at least the public key K22 (step S511). The client device 200 decrypts the E_TK using its own private key K21 to acquire the token TK (step S512). Using this token TK, the client device 200 accesses the external service 500 (step S513).

(5. Utilization Mode Examples)

Next, examples of utilization modes according to an embodiment according to the present disclosure will be described with reference to FIGS. 7 and 8.

(5-1. When a Terminal Device is Online)

FIG. 7 is a diagram illustrating an example of a utilization mode when a terminal device is online according to an embodiment of the present disclosure. In this case, the client device 200 transmits an ID utilization request or a token acquisition request to the terminal device 100 via the server 300. The terminal device 100 similarly provides the ID or the token to the client device 200 via the server 300.

In the illustrated example, the user (who may be the user U or another user) utilizing the client device 200 inputs an ID and password via the UI, and selects the external service to be utilized. Thus, the client device 200 may utilize a plurality of external services of different types. Here, based on the input ID and password, the terminal device 100 authenticates the client device 200. The ID and password may be the ID and password for any of the external services utilized by the user U, or may be an ID and prepared in order to utilize the service according to an embodiment of the present disclosure. In the latter case, an ID and password may be prepared for each client device 200.

On the other hand, at the terminal device 100 which has received the ID utilization request or token authorization request from the client device 200, a UI is displayed that includes, as a notification of the ID utilization request, the name (Client A) of the client device 200 and the name (Service A) of the external service to be utilized. In response to this notification, in addition to permit (OK) and not permit (NG), the user U can also select permit for a predetermined time (momentarily OK). In this case, the meaning of "permit for a predetermined time" is not limited to the current ID utilization request, it may also mean giving permission to a ID utilization request or token authorization request from the client device 200 for a predetermined number of times or a predetermined duration. On the other hand, "permit" may mean giving permission to only the current ID utilization request or token authorization request from the client device 200.

(5-2. When a Terminal Device is Offline)

FIG. 8 is a diagram illustrating an example of a utilization mode when a terminal device is offline according to an embodiment of the present disclosure. In this case, although the client device 200 can communicate with the server 300, the client device 200 cannot transmit an ID utilization request or a token acquisition request to the terminal device 100.

However, in such a case, for example, based on processing like the above-described token provision processing, if a token for utilizing an external service, or information about an authentication result corresponding to a taken, is stored in the server 300 or the client device 200, during the period that the token or authentication result is valid, the client device 200 can access the external service. In this case, at the client device 200, a UI similar to that when the terminal device 100 is online can be provided. Consequently, during the period that the external service can be utilized because the token or authentication result is still valid, the user of the client device 200 can utilize the external service without having to worry about the online state of the terminal device 100.

(6. Data Flow)

Next, an example of the data flow according to an embodiment of the present disclosure will be described with reference to FIGS. 9 to 12.

(Terminal Device)

FIG. 9 is a diagram illustrating an example of the data flow in a terminal device according to an embodiment of the present disclosure. In the illustrated example, an encrypted ID from the client device 200 is provided to the terminal device 100, and is decrypted (151). Thus, the input of the ID to the terminal device 100 may be executed based on the terminal device 100 receiving the ID acquired by the client device 200. Here, the ID that is provided from the client device 200 may be encrypted with the public key K12 (corresponding to the private key K11 stored by the terminal device 100) stored by the client device 200, for example. In this case, the terminal device 100 acquires the ID by decrypting the encrypted ID using its own private key K11.

The terminal device 100 segments the acquired and decrypted ID (152), encrypts the segmented IDs, and deploys them in the data store 400 (153). At this point, the data flow can also be configured so that the user U additionally needs to input a password (160).

On the other hand, if the ID utilization request from the client device 200 has been received, the terminal device 100 collects and decrypts the data deployed in the data store 400 (154), and acquires the segmented IDs. Further, the terminal device 100 combines the segmented IDs (155), and acquires the ID. At this point also, the data flow can also be configured so that the user U additionally needs to input a password (160). The terminal device 100 encrypts this ID using the public key K22 (156), and provides the encrypted ID to the client device 200.

In the above data flow, the private key K11 used to decrypt the data acquired from the client device 200 and the public key K22 used to encrypt the data provided to the client device 200 are provided from the server 300 and stored in the key store 130. Further, an encryption key K31 for encrypting (153) and decrypting (154) the segmented IDs stored in the data store 400 may also be stored in the key store 130. The encryption key K31 may also be provided from the server 300. Since the segmented IDs are not encrypted or decrypted on the data store 400 side, the encryption key K31 can be a common key whose use is limited to within the terminal device 100.

Further, concerning the segmentation of the ID (152), deployment of the segmented IDs (153), collection of the segmented IDs (154), and combining of the segmented IDs (155), the terminal device 100 can refer to data store setting information (157) provided from the server 300. As already stated, according to an embodiment of the present disclosure, concerning the segmentation of the ID and storage in the data store 400, the distribution level and the deployment multiplicity can be arbitrarily set by the user U. In this case, information about what setting can be made may be provided to the user U based on device setting information (157).

Further, the terminal device 100 transmits information about its own device profile/capability (158) to the server 300 when requesting registration as an authenticated station, for example.

(Client Device)

FIG. 10 is a diagram illustrating an example of a data flow in a client device according to an embodiment of the present disclosure. Similar to the example illustrated in FIG. 9, the ID acquired from the external service 500 by the client device 200 is encrypted (251), and provided to the terminal device 100. Here, the ID provided to the terminal device 100 may be, for example, encrypted with the public key K12 (corresponding to the private key K11 stored by the terminal device 100) stored in the key store 220.

Note that according to an embodiment of the present disclosure, the client device 200 does not store the acquired ID as is even when it acquires the ID by itself in this way from the external service 500. From the perspective of ID utilization security, after the ID has been provided to the terminal device 100, it is desirable for the ID to be discarded by the client device 200. Alternatively, the client device 200 may be configured so that it stores only an ID that it acquired itself after the ID has been provided to the terminal device 100.

When utilizing the ID to access the external service 500, the client device 200 receives the encrypted ID from the terminal device 100, and decrypts the received encrypted ID (252). The private key K21 (corresponding to the public key K22 stored by the terminal device 100) stored in the key store 220 may be used for this decryption, for example.

Further, the client device 200 transmits information about its own device profile/capability (253) to the server 300 when requesting registration as a user, for example.

(Server)

FIG. 11 is a diagram illustrating an example of a data flow in a server according to an embodiment of the present disclosure. The server 300 registers (351) the client device 200 based on information about the device profile/capability (253) provided from the client device 200. At this time, the private key K21 and the public key K12 are provided to the client device 200. As described above, the private key K21 is issued for the client device 200 as a pair with the public key K22. Consequently, the private key K21 can be provided during registration of the client device 200. On the other hand, since the public key K12 is issued for the terminal device 100 as a pair with the private key K11, the public key K12 is not issued if the terminal device 100 is unregistered. In this case, the public key K12 is provided to the client device 200 after registration of the terminal device 100. The public key K12 is also stored in the key store 320 of the server 300.

Further, the server 300 registers (352) the terminal device 100 based on information about the device profile/capability (158) provided from the terminal device 100. At this time, the public key K22 and the private key K11 are provided to the terminal device 100. As described above, the private key K11 is issued for the terminal device 100 as a pair with the public key K12. Consequently, the private key K11 can be provided during registration of the terminal device 100. On the other hand, since the public key K22 is issued for the client device 200 as a pair with the private key K21, the public key K22 is not issued if the client device 200 is unregistered. In this case, the public key K22 is provided to the terminal device 100 after registration of the client device 200. The public key K22 is also stored in the key store 320 of the server 300.

In addition, the server 300 registers (353) the data store 400 based on information about the device profile/capability (453) provided from the data store 400. The information registered by the registration of the client device 200 (351), registration of the terminal device 100 (352), and registration of the data store 400 (353) is stored in the server 300 as device setting information (354), and is provided as necessary to the terminal device 100 and the like. For example, permission information (355) about the user U and settings (356) made by the user U may be reflected in the device setting information (354).

(Data Store)

FIG. 12 is a diagram illustrating an example of a data flow in a data store according to an embodiment of the present disclosure. The data store 400 stores the segmented and encrypted ID (451) provided from the terminal device 100 in a data store (452). Further, the data store 400 transmits information about its own device profile/capability (453) to the server 300. As described above, since the data store 400 includes a plurality of nodes 410, this data flow can occur at each node 410.

(7. Embodiment Summary)

According to an embodiment of the present disclosure described above, the following advantageous effects, for example, can be obtained.

Security and Sense of Reassurance Due to Keeping Information Close by

According to an embodiment of the present disclosure, the information (ID) to be protected for the user U is managed in an integrated manner in the terminal device 100 which the user U is carrying around. Therefore, from the user U's perspective, it is clear what needs to be protected as his/her own personal information, so that a higher sense of reassurance can be obtained as compared with when personal information is managed by someone else, such as the server operator.

Further, according to an embodiment of the present disclosure, the server 300 does not store the ID. Therefore, the ID cannot be stolen from the server 300. In addition, even when the terminal device 100 and the client device 200 are exchanging the ID via the server 300, by encrypting in a manner like that described above and discarding at the server 300 the key that can be used for decryption, the reading of the ID by the server 300 can be prevented.

Moreover, for example, if determining permission for ID usage in the terminal device 100 every time the client device 200 accesses an external service feels bothersome to the user U, or if the terminal device 100 may be online, additionally, a token that temporarily enables access to the external service can be acquired by the terminal device 100 and temporarily stored in the client device 200 or the server 300.

As already described above, according to an embodiment of the present disclosure, the server 300 does not store the ID. Therefore, even if information stored in the server 300 is somehow stolen, the ID is not leaked. Further, even if the terminal device 100 is stolen, for example, if the server 300 blocks the exchange of the ID between the terminal device 100 and the client device 200, unauthorized utilization of the ID managed by the terminal device 100 can be prevented (although the terminal device 100 and the client device 200 could be the same device, even if such a case, if the device is set so that the function portion of the terminal device 100 is temporarily accessed via the server 300 when the function portion of the client device 200 is utilizing the ID, unauthorized utilization of the ID is not easy).

Further, the segmentation and storage of the ID from the terminal device 100 in the data store 400 also has an effect of preventing unauthorized utilization of the ID when the terminal device 100 or some of the nodes 410 in the data store 400 are stolen.

Clarification of ID Utilization Timing

With the progress in cooperation among external services, it has become difficult for a user to know when and what kind of ID will be utilized. According to an embodiment of the present disclosure, the user U can easily grasp when and how an ID is being utilized based on the terminal device 100 outputting a notification about an ID utilization request to the user U. Obviously, the user U can block utilization of the ID by the client device 200 by rejecting the ID utilization request in the notification.

(8. Hardware Configuration)

A hardware configuration of an information processing device according to an embodiment of the present disclosure will now be described with reference to FIG. 13. FIG. 13 is a block diagram illustrating a hardware configuration of an information processing device. As described in the above embodiment of the present disclosure, an information processing device 900 illustrated in FIG. 13 can realize the terminal device 100, the client device 200, the server 300, and the data store 400 nodes 410.

The information processing device 900 includes a CPU (central processing unit) 901, a ROM (read-only memory) 903, and a RAM (random access memory) 905. Further, the information processing device 900 may also include a host bus 907, a bridge 909, an external bus 911, an interface 913, an input device 915, an output device 917, a storage device 917, a drive 921, a connection port 923, and a communication apparatus 925. In addition, the information processing device 900 may optionally include an imaging device 933 and a sensor 935. The information processing device 900 can have instead of, or in addition to, the CPU 901, a processing circuit such as a DSP (digital signal processor).

The CPU 901, which functions as a calculation processing device and a control device, controls all or a part of the operations in the information processing device 900 based on various programs recorded in the ROM 903, RAM 905, storage device 917, or a removable recording medium 927. The ROM 903 stores programs, calculation parameters and the like used by the CPU 901. The RAM 905 temporarily stores the programs to be used during execution by the CPU 901, and parameters that appropriately change during that execution. The CPU 901, ROM 903, and RAM 905 are connected to each other by the host bus 907, which is configured from an internal bus such as a CPU bus. In addition, the host bus 907 is connected to the external bus 911, which is a PCI (peripheral component interconnect/interface) bus or the like.

The input device 915 is a device that is operated by the user, such as a mouse, keyboard, touch panel, button, switch, lever and the like. The input device 915 may be, for example, a remote control device that utilizes infrared rays or other radio waves, or may be an external connection device 929, such as a mobile telephone that supports the operations of the information processing device 900. The input device 915 includes an input control circuit that generates an input signal based on information input by the user, and outputs the generated input signal to the CPU 901. The user inputs various types of data into the information processing device 900 and issues processing operation instructions by operating this input device 915.

The output device 917 is configured from a device that can visually or aurally notify the user of acquired information. The output device 917 may be, for example, a display device such as a LCD (liquid crystal display), a PDP (plasma display panel), and an organic EL (electro-luminescence) display, an audio output device such as a speaker or headphones, or a printer device. The output device 917 outputs results obtained based on processing by the information processing device 900 as video such as text or images, and audio such as voice or acoustic sound.

The storage device 919 is a device for storing data that is configured as an example of the storage unit of the information processing device 900. The storage device 919 is configured from, for example, a magnetic storage unit device such as a HDD (hard disk drive), a semiconductor storage device, an optical storage device, a magneto-optical storage device and the like. This storage device 919 stores programs and various types of data executed by the CPU 901, and various types of externally-acquired data, for example.

The drive 921 is a reader/writer for the removable recording medium 927, such as a magnetic disk, an optical disc, a magneto-optical disk, or a semiconductor memory. The drive 921 is installed in the information processing device 900 or is externally attached. The drive 921 reads information recorded on a mounted removable recording medium 927, and outputs the read information to the RAM 905. Further, the drive 921 writes a record on the mounted removable recording medium 927.

The connection port 923 is a port for directly connecting a device to the information processing device 900. The connection port 923 may be, for example, a USB (universal serial bus) port, an IEEE 1394 port, a SCSI (small computer system interface) port and the like. Further, the connection port 923 may be an RS-232C port, an optical audio terminal, a HDMI (high-definition multimedia interface) port and the like. By connecting the external connection device 929 to the connection port 923, various types of data can be exchanged between the information processing device 900 and the external connection device 929.

The communication apparatus 925 is a communication interface configured from a communication device for connecting to a communication network 931, for example. The communication apparatus 925 may be a wired or a wireless LAN (local area network), Bluetooth®, or WUSB (wireless USB) communication card, for example. Further, the communication apparatus 925 may be an optical communication router, an ADSL (asymmetric digital subscriber line) router, or a modem used for various types of communication. The communication apparatus 925 transmits and receives signals and the like using a predetermined protocol such as TCP/IP to/from the Internet or another communication device. In addition, the communication network 931 connected to the communication apparatus 925 is a wired or wirelessly connected network, such as the Internet, a home LAN, infrared communication, radio wave communication, or satellite communication.

The imaging device 933 is a device that generates images by capturing images of real space using various parts, for example an image sensor such as a CCD (charge-coupled device) or a CMOS (complementary metal oxide semiconductor), and a lens for controlling the formation of an image of an object on the image sensor. The imaging device 933 can capture still images or moving images.

The sensor 935 may be a variety of sensors, for example an acceleration sensor, a gyro sensor, a geomagnetism sensor, a light sensor, a sound sensor and the like. The sensor 935 acquires information relating to the state of the information processing device 900 itself, such as the orientation of the information processing device 900's casing, and information relating to the surrounding environment of the information processing device 900, such as the light and noise around the information processing device 900. Further, the sensor 935 may also include a GPS (global positioning system) sensor that receives GPS signals for measuring the longitude, latitude, and elevation of the device.

In the above, an example was illustrated of the hardware configuration of the information processing device 900. The above-described constituent elements may be configured using multi-purpose parts or from hardware specialized for the function of each constituent element. This configuration may be appropriately modified based on the technological level at the time of implementation.

(9. Supplement)

It should be understood by those skilled in the art that various modifications, combinations, sub-combinations and alterations may occur depending on design requirements and other factors insofar as they are within the scope of the appended claims or the equivalents thereof.

For example, in the above embodiment of the present disclosure, although the terminal device and the client device exchanged the ID utilization request and the ID via a server, the present technology is not limited to this example. For example, the terminal device and the client device may directly exchange the ID utilization request and the ID via a network based on a P2P (peer-to-peer) method. Further, if the terminal device and the client device are close, the devices can also communicate with each other via NFC (near field communication) or a LAN (local area network).

Further, for example, in the above embodiment of the present disclosure, although the terminal device managed the ID and the password when utilizing an external service, the present technology is not limited to this example. For example, what is managed by the terminal device may be the personal information about another user, such as an E-mail address, a name, a telephone number and the like. This information may also be input in order to use the external service, and thus needs to be protected from being leaked. In terms of these points, such information is similar to authentication information such as the ID and password. In the present disclosure, information like the above-described ID, password, and personal information about another user are referred to as user-related information.

In addition, for example, in the above embodiment of the present disclosure, although the ID is stored in a data store, and the terminal device acquires the ID from the data store, the present technology is not limited to this example. For example, the terminal device may store the ID in its own storage unit, and provide the ID to the client device by acquiring it internally.

An embodiment of the present disclosure includes, for example, the above-described terminal device, system (information processing system), method (information processing method), program for making a terminal device function, and recording medium on which a program is stored.

Additionally, the present technology may also be configured as below.

(1) A terminal device including:
a user-related information acquisition unit configured to acquire user-related information to be used in a service based on a request from a client device accessing the service; and
a user-related information provision unit configured to provide the user-related information to the client device.
(2) The terminal device according to (1), wherein the user-related information provision unit is configured to provide the user-related information to the client device via a server managing the client device.
(3) The terminal device according to (2), wherein the user-related information provision unit is configured to provide the user-related information that has been encrypted using a public key corresponding to a private key stored by the client device to the client device.
(4) The terminal device according to any one of (1) to (3), further including a user permission acquisition unit configured to output a notification to a user when there has been a request from the client device, and acquire permission from the user concerning provision of the user-related information,
wherein the user-related information acquisition unit is configured to acquire the user-related information when permission from the user has been acquired.
(5) The terminal device according to any one of (1) to (4), wherein the user-related information acquisition unit is configured to acquire the user-related information that has been distributed and stored in a plurality of data nodes.
(6) The terminal device according to (5), further including a user-related information storage unit configured to distribute and store the user-related information in the data nodes based on information acquired from a server managing the data nodes.
(7) The terminal device according to (5) or (6), wherein the data nodes include an element relating to a user behavior.
(8) The terminal device according to (7), wherein the data nodes include at least one from among input of a pass phrase by the user, biological information about the user, position information about the user, or movement information about the user.
(9) The terminal device according to any one of (1) to (8), wherein the service includes a plurality of services of different types, and
wherein the user-related information acquisition unit is configured to select and acquire the user-related information based on a type of the service to be accessed by the client device.
(10) The terminal device according to (9), wherein the user-related information acquisition unit is configured to authenticate the client device based on authentication information that is included in a request from the client device for utilizing one of the plurality of services of different types.
(11) The terminal device according to any one of (1) to (10), wherein the user-related information is authentication information for utilizing the service.
(12) The terminal device according to any one of (1) to (10), wherein the user-related information is token information for utilizing the service, and wherein the user-related information acquisition unit is configured to acquire the token information by accessing the service using the authentication information for utilizing the service.
(13) An information processing system including:
a client device configured to access a service; and
a terminal device capable of acquiring user-related information to be used by the service,
wherein the client device is configured to transmit a request to the terminal device for the user-related information, and
wherein the terminal device is configured to acquire the user-related information based on the request and provide the acquired user-related information to the client device.
(14) The information processing system according to (13), further including a server configured to manage the client device and the terminal device,
wherein the client device is configured to transmit a request to the terminal device for the user-related information via the server, and
wherein the terminal device is configured to provide the user-related information to the client device via the server.
(15) The information processing system according to (14), wherein the server is configured to generate a pair of a private key and a public key, and discard at least the private key after the private key has been provided to the client device and the public key has been provided to the terminal device,
wherein the terminal device is configured to provide the user-related information that has been encrypted using the public key to the client device, and
wherein the client device is configured decrypt the user-related information using the private key.
(16) The information processing system according to any one of (13) to (15), wherein the terminal device is configured to output a notification to the user when there has been a request for the user-related information, and provide the user-related information to the client device when permission from the user for provision of the user-related information has been acquired.
(17) An information processing method including:
transmitting with a client device that accesses a service a request for user-related information to a terminal device capable of acquiring user-related information to be used by the service; and
acquiring with the terminal device the user-related information based on the request and providing the acquired user-related information to the client device.
(18) A program for executing on a computer:
a function of acquiring user-related information to be used in a service based on a request from a client device accessing the service; and
a function of providing the user-related information to the client device.

(19) An information processing apparatus, comprising: a processor including a receiving unit to receive a request for user data related to an external service; a retrieving unit to retrieve segmented user data based on the request; and a providing unit to combine the segmented user data to generate the user data related to the external service, and to provide the user data related to the external service to a device from which the request was received.

(20) The information processing apparatus of (19), wherein the processor further includes an authentication user interface to notify a user of the request received.

(21) The information processing apparatus of (20), wherein the retrieving unit retrieves the segmented user data when the authentication user interface receives permission from the user.

(22) The information processing apparatus of any one of (20) to (21), wherein the retrieving unit does not retrieve the segmented user data when the authentication user interface does not receive permission from the user.

(23) The information processing apparatus of any one of (19) to (22), wherein the processor further includes a management unit to segment user data and to store user data segments in a plurality of data storage units.

(24) The information processing apparatus of (23), wherein the management unit stores a different subset of user data segments in each of the plurality of data storage units.

(25) The information processing apparatus of any one of (19) to (24), wherein at least one user data segment corresponds to user biological information.

(26) The information processing apparatus of any one of (19) to (24), wherein at least one user data segment corresponds to user behavior.

(27) The information processing apparatus of (26), wherein the user behavior corresponds to entry of personal identification information.

(28) The information processing apparatus of (26), wherein the user behavior corresponds to at least one of user location, orientation or position.

(29) The information processing apparatus of any one of (19) to (28), wherein the providing unit provides the user data to the device via a server.

(30) The information processing apparatus of any one of (19) to (29), wherein the providing unit encrypts the user data using a public key corresponding to a private key of the device, and transmits the encrypted user data to the device via the server.

(31) The information processing apparatus of any one of (19) to (30), wherein the retrieving unit retrieves the user data based on an external service to be accessed from the client device.

(32) The information processing apparatus of any one of (23) to (31), wherein the authentication user interface receives user data and the management unit segments the user data received by the authentication user interface.

(33) The information processing apparatus of (32), wherein the authentication user interface receives the user data through direct user entry.

(34) The information processing apparatus of any one of (19) to (33), wherein the user data includes a user identification and a user password.

(35) An information processing method, comprising: receiving, at a processor, a request for user data related to an external service; retrieving, by the processor, segmented user data based on the request; combining, at the processor, the segmented user data to generate the user data related to the external service; and providing, from the processor, the user data related to the external service to a device from which the request was received.

(36) An information processing system comprising: a server configured to provide an external service; a client device configured to access the external service; a plurality of data storage units configured to store segmented user data; and a terminal device including a processor configured to receive a request for user data related to the external service from the client device, retrieve, from the plurality of data storage units, segmented user data corresponding to the user data related to the external service requested by the client device, combine the segmented user data retrieved to form the user data related to the external service, and provide the user data related to the external service to the client device.

(37) A non-transitory computer-readable medium encoded with computer-readable instructions thereon, the computer-readable instructions when executed by a computer cause the computer to perform a method comprising: receiving a request for user data related to an external service; retrieving segmented user data based on the request; combining the segmented user data to generate the user data related to the external service; and providing the user data related to the external service to a device from which the request was received.

(38) An information processing system, comprising: a client device configured to access an external service using a token; and a terminal device configured to obtain the token from the external service based on a token acquisition request received from the client device via a server, the terminal device providing identification information to the external service to obtain the token, wherein the terminal device encrypts the token obtained from the external service to form an encrypted token and transmits the encrypted token to the client device, and the client device decrypts the encrypted token to obtain the token and provides the token to the external service to access the external service.

REFERENCE SIGNS LIST

10 System
100 Terminal device
110 ID controller
112 Authorization/authentication UI
114 Plug-in authentication logic 114
120 ID server
130 Key store
140 Data store manager
200 Client device
210 ID client
220 Key store
300 Server
310 Key provider
320 Key store
400 Data store
410 Node
420 ID distributor
430 Security manager

The invention claimed is:
1. An information processing apparatus, comprising:
a memory configured to store instructions; and
a central processing unit (CPU) configured to execute the instructions stored in the memory to:
receive, from a device via a network, a request to provide user data to the device, wherein the user data includes authentication information, and wherein the user data is related to an external service;

obtain segmented user data stored in a plurality of data storage units, based on the request and based on a user permission received by the information processing apparatus to access the external service;

generate the user data related to the external service by combination of the segmented user data stored in the plurality of data storage units; and control transmission of the user data related to the external service to the device via the network, wherein the device receives the transmitted user data and accesses the external service based on the received user data, and wherein the received user data includes the authentication information.

2. The information processing apparatus according to claim 1, wherein the CPU is further configured to control a display device to a notification of the received request via an authentication user interface.

3. The information processing apparatus according to claim 2, wherein the CPU is further configured to:

receive a user operation on the authentication user interface, wherein the user operation indicates the user permission to access the external service, and wherein the user permission to access the external service is valid for a defined time duration; and retrieve the segmented user data based on the user permission.

4. The information processing apparatus according to claim 3, wherein the CPU is further configured to prevent retrieval of the segmented user data based on a lack of reception of the user operation that indicates the user permission.

5. The information processing apparatus according to claim 1, wherein the CPU is further configured to:

segment the user data into user data segments; and
store the user data segments in the plurality of data storage units.

6. The information processing apparatus according to claim 5, wherein the CPU is further configured to store a different subset of the user data segments in each of the plurality of data storage units.

7. The information processing apparatus according to claim 6, wherein at least one user data segment of the user data segments corresponds to user biological information.

8. The information processing apparatus according to claim 6, wherein at least one user data segment of the user data segments corresponds to user behavior.

9. The information processing apparatus according to claim 8, wherein the user behavior corresponds to an entry of personal identification information.

10. The information processing apparatus according to claim 8, wherein the user behavior corresponds to at least one of a user location, an orientation, or a user position.

11. The information processing apparatus according to claim 1, wherein the CPU is further configured to control the transmission of the user data to the device via a server.

12. The information processing apparatus according to claim 1, wherein the CPU is further configured to:

encrypt the user data based on a public key that corresponds to a private key of the device; and control transmission of the encrypted user data to the device via a server.

13. The information processing apparatus according to claim 1, wherein the CPU is further configured to retrieve the user data based on the external service to be accessed from the device.

14. The information processing apparatus according to claim 1, wherein the CPU is further configured to:

receive the user data; and
segment the received user data.

15. The information processing apparatus according to claim 14, wherein the CPU is further configured to receive the user data based on user input.

16. The information processing apparatus according to claim 1, wherein the authentication information comprises at least one of a user identification or a user password.

17. An information processing method, comprising:

in an information processing apparatus that includes one or more processors:

receiving, from a device via a network, a request to provide user data to the device, wherein the user data includes authentication information, and wherein the user data is related to an external service;

obtaining segmented user data stored in a plurality of data storage units, based on the request and based on a user permission received by the information processing apparatus to access the external service;

generating the user data related to the external service by combining the segmented user data stored in the plurality of data storage units; and controlling transmission of the user data related to the external service to the device through the network, wherein the device receives the transmitted user data and accesses the external service based on the received user data, and wherein the received user data includes the authentication information.

18. An information processing system, comprising:

a server configured to provide an external service;
a client device configured to access the external service;
a plurality of data storage units configured to store segmented user data; and
a terminal device that includes a processor configured to:

receive, from the client device via a network, a request to provide user data to the client device, wherein the user data includes authentication information, and wherein the user data is related to the external service;

obtain, from the plurality of data storage units, the segmented user data based on the request and based on a user permission received by the terminal device to access the external service;

generate the user data related to the external service by combination of the segmented user data obtained from the plurality of data storage units; and control transmission of the user data related to the external service to the client device via the network, wherein the client device is configured to:
receive the transmitted user data; and
access the external service based on the received user data, and wherein the received user data includes the authentication information.

19. A non-transitory computer-readable medium having stored thereon computer-readable instructions which, when executed by a computer, cause the computer to execute operations, the operations comprising:

in a terminal device:

receiving, from a device via a network, a request to provide user data to the device, wherein the user data includes authentication information, and wherein the user data is related to an external service;

obtaining segmented user data stored in a plurality of data storage units, based on the request and based on a user permission received by the terminal device to access the external service;

generating the user data related to the external service by combining the segmented user data obtained from the plurality of data storage units; and controlling transmission of the user data related to the external service to the device through the network, wherein the device receives the transmitted user data and accesses the external service based on the received user data, wherein the received user data includes the authentication information.

20. An information processing system, comprising:

a client device that comprises a first central processing unit (CPU), wherein the first CPU is configured to access an external service based on a token; and a terminal device that comprises a second central processing unit (CPU), wherein the second CPU is configured to:

receive a token acquisition request for the token from the client device via a network;

control, based on the token acquisition request received from the client device, a display device to display a user interface, wherein the user interface includes information that indicates a name of the client device and a name of the external service;

receive a user operation on the displayed user interface, wherein the user operation indicates a user permission to access the external service;

control transmission of identification information to the external service to obtain the token from the external service based on the token acquisition request received from the client device, and based on the user permission to access the external service, wherein the token includes authentication information;

encrypt the token obtained from the external service to generate an encrypted token; and control transmission of the encrypted token to the client device, wherein the first CPU is further configured to:

decrypt the encrypted token to obtain the token; and control transmission of the token to the external service to access the external service based on the token, and wherein the token includes the authentication information.

* * * * *